US012610417B2

(12) United States Patent
Luo et al.

(10) Patent No.: US 12,610,417 B2
(45) Date of Patent: Apr. 21, 2026

(54) IAB LINK CONTROL METHOD, COMMUNICATION UNIT AND COMPUTER READABLE STORAGE MEDIUM

(71) Applicant: ZTE CORPORATION, Shenzhen (CN)

(72) Inventors: Wei Luo, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 645 days.

(21) Appl. No.: 17/431,064

(22) PCT Filed: Feb. 14, 2020

(86) PCT No.: PCT/CN2020/075208
§ 371 (c)(1),
(2) Date: Aug. 13, 2021

(87) PCT Pub. No.: WO2020/164569
PCT Pub. Date: Aug. 20, 2020

(65) Prior Publication Data
US 2022/0141749 A1     May 5, 2022

(30) Foreign Application Priority Data
Feb. 14, 2019    (CN) ......................... 201910115200.4

(51) Int. Cl.
*H04W 76/19*        (2018.01)
*H04W 36/00*        (2009.01)

(52) U.S. Cl.
CPC ....... *H04W 76/19* (2018.02); *H04W 36/0064* (2023.05); *H04W 36/00838* (2023.05)

(58) Field of Classification Search
CPC . H04W 36/30; H04W 36/0055; H04W 76/19; H04W 36/305; H04W 40/24;
(Continued)

(56) References Cited

U.S. PATENT DOCUMENTS

2016/0174282 A1* 6/2016 Grant ................ H04W 36/0079
                                                    455/422.1
2021/0176692 A1* 6/2021 Rugeland .............. H04W 76/11
(Continued)

FOREIGN PATENT DOCUMENTS

CN          108513323 A        9/2018
CN          110536350 A        12/2019
(Continued)

OTHER PUBLICATIONS

Intel Corporation, "Adaptation layer and Routing for IAB in NR", *3GPP TSG RAN WG3 Meeting* #100, R3-183169, May 25, 2018 (May 25, 2018), section 2.
(Continued)

*Primary Examiner* — Harun Chowdhury
(74) *Attorney, Agent, or Firm* — Morgan, Lewis & Bockius LLP

(57)        ABSTRACT

Disclosed are an IAB link control method, a communication unit and a computer-readable storage medium. The communication unit receives control information sent by a CU, and an operation corresponding to the control information is executed according to the control information, where the communication unit includes at least one of an IAB, a terminal, a DU, a terminal part of an IAB, a DU part of an IAB or a relay. The communication unit performs a corresponding control operation on an IAB link according to the control information sent by the CU, so as to reduce an interruption delay.

12 Claims, 15 Drawing Sheets

An IAB acquires that a link failure occurs to an upstream IAB of the IAB or an upstream IAB of the IAB is executing a link migration/adjustment    S301

The IAB sends link state indication information to a donor CU or a child IAB    S302

(58) Field of Classification Search

CPC ............. H04W 76/12; H04W 28/0289; H04W 28/0236; H04W 36/0083; H04W 76/27; H04W 84/047; H04W 40/22

USPC ................................. 370/225, 328, 329, 331

See application file for complete search history.

(56) References Cited

U.S. PATENT DOCUMENTS

| | | | | |
|---|---|---|---|---|
| 2021/0219183 A1* | 7/2021 | Huang | .............. | H04W 28/0278 |
| 2022/0053588 A1* | 2/2022 | Shaheen | ............... | H04W 40/22 |
| 2022/0110179 A1* | 4/2022 | Sheng | .................... | B65D 5/241 |
| 2022/0132337 A1* | 4/2022 | Muhammad | .......... | H04W 40/34 |

FOREIGN PATENT DOCUMENTS

| | | |
|---|---|---|
| GB | 2577531 A | 4/2020 |
| KR | 20130102013 A | 9/2013 |
| KR | 20140107120 A | 9/2014 |

OTHER PUBLICATIONS

International Search Report for Application No. PCT/US2020/075208, dated May 8, 2020, 5 pages including English translation.

ZTE et al., "Control Plane Signaling Delivery in NSA Deployment", *3GPP TSG RAN WG2 Meeting* #104, R2-1817420, Nov. 16, 2018 (Nov. 16, 2018), section 2, figure 1.

ZTE: "Discussion on backhaul link failure and recovery" , 3GPP Draft; R3-185539 Discussion on Backhaul Link Failure and Recovery, 3$^{rd}$ Generation Partnership Project (3GPP), Mobile Competence Centre; 650, Route Des Lucioles; F-06921 Sophia-Antipolis Cedex vol. RAN WG3, No. Chengdu, China; Oct. 8, 2018-Oct. 12, 2018 Sep. 29, 2018 (Sep. 29, 2018), XP051528814, Retrieved from the Internet: URL:http://www.3gpp.org/ftp/tsg%5Fran/WG3%5Fiu/TSGR3%5FI0lbis/Docs/R3%2DI85539%2Ezip [retrieved on Sep. 29, 2018].

KDDI Corporation: "Text proposal for FFS resolution", 3GPP Draft; R2-1818763_IAB_FFS_RESOLUTION, 3rd Generation Partnership Project (3GPP), Mobile Competence Centre; 650, Route Des Lucioles; F-06921 Sophia-Antipolis Cedex; France vol. RAN WG2, No. Spokane, USA; Nov. 12, 2018-Nov. 16, 2018, Nov. 17, 2018 (Nov. 17, 2018), XP051495029, Retrieved from the Internet: URL:http://www.3gpp.org/ftp/tsg%5Fran/WG2%5FRL2/TSGR2%5FI04/Docs/R2%2DI818763%2Ezip [retrieved on Nov. 17, 2018].

"3rd Generation Partnership Project; Technical Specification Group Radio Access Network; NR; Study on Integrated Access and Backhaul; (Release 16) ", 3GPP Draft; 38874-G00, 3rd Generation Partnership Project (3GPP), Mobile Competence Centre; 650, Route Des Lucioles; F-06921 Sophia-Antipolis Cedex ; France Jan. 11, 2019 (Jan. 11, 2019), XP051576885, Retrieved from the Internet: URL:http://www.3gpp.org/ftp/tsg%5Fran/WG2%5FRL2/Specifications/201812%5Ffinal%5Fspecs%5Fafter%5FRAN%5F82/38874%2Dg00%2Ezip [retrieved on Jan. 11, 2019].

Supplementary Partial European Search Report of Application No. EP20755437, dated Sep. 30, 2022, 15 pages.

Chinese Office Action in Application No. 201910115200.4 dated Jan. 24, 2024, 8 pages including translation.

Chinese Search Report in Application No. 201910115200.4 dated Jan. 22, 2024, 6 pages including translation.

Korean Office Action in Application No. 10-2021-7029359 dated Jan. 9, 2024, 15 pages including translation.

Huawei, "Basic principles for IAB topology adaptation", 3GPP TSG-RAN WG2 #103, R2-1812833, Aug. 20-Aug. 24, 2018, Gothenburg, Sweden.

Intel Corporation, "[Offline discussion 105] Text proposal—Backhaul Failure", 3GPP TSG RAN WG2 Meeting #104, R2-1818746, Nov. 12-16, 2018, Spokane, U.S.A.

European Office Action for Application No. 20755437.9, dated Feb. 26, 2024, 9 pages.

Qualcomm Incorporated, "Enhancements to support NR backhaul links", 3GPP TSG RAN WG1 Meeting #95, R1-1813417, Spokane, USA, Nov. 12, 2018, 21 pages.

Chinese Office Action in Application No. 201910115200.4, dated Jun. 19, 2024, 8 pages including translation.

Chinese Search Report in Application No. 201910115200.4, dated Jun. 17, 2024, 8 pages including translation.

"3$^{rd}$ Generation Partnership Project; Technical Specification Group Radio Access Network; Study on Integrated Access and Backhaul; (Release 15)", 3GPP TR 38.874, v. 0.7.0, Nov. 30, 2018, 111 pages.

* cited by examiner

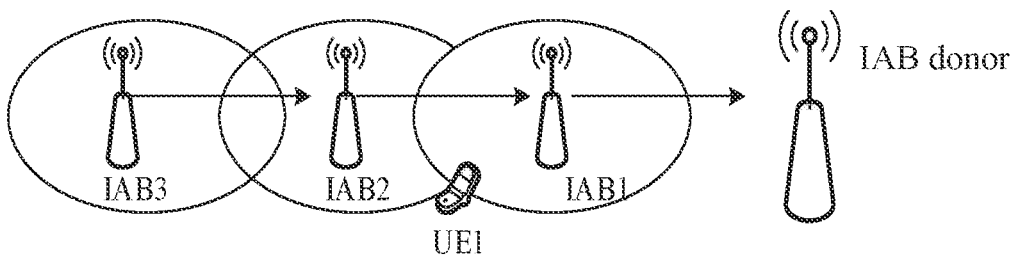
FIG. 1
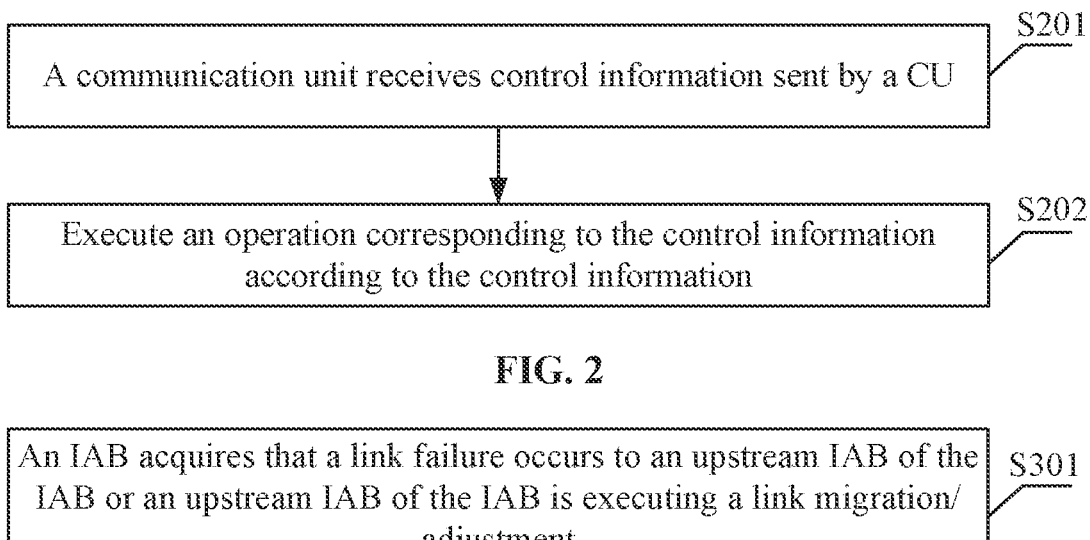
FIG. 2
| An IAB acquires that a link failure occurs to an upstream IAB of the IAB or an upstream IAB of the IAB is executing a link migration/adjustment | S301 |
| The IAB sends link state indication information to a donor CU or a child IAB | S302 |
FIG. 3

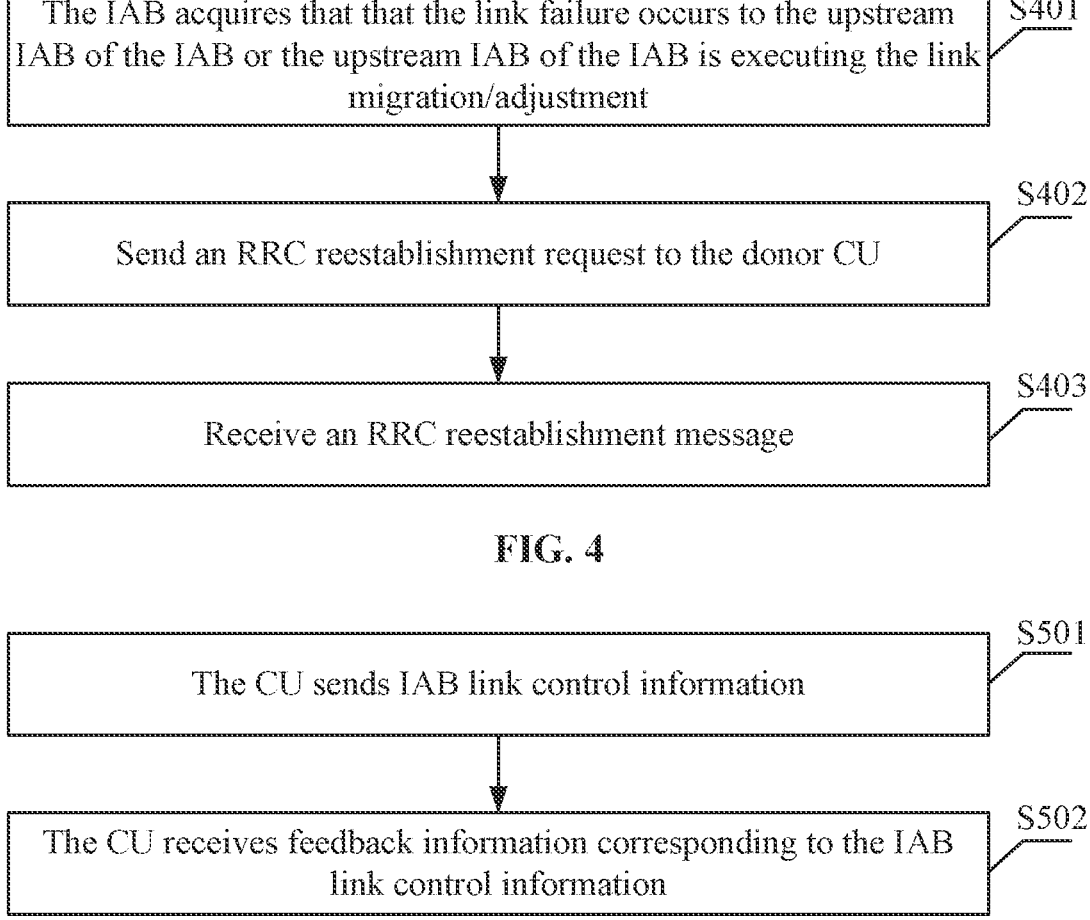

The IAB acquires that that the link failure occurs to the upstream IAB of the IAB or the upstream IAB of the IAB is executing the link migration/adjustment — S401

Send an RRC reestablishment request to the donor CU — S402

Receive an RRC reestablishment message — S403

FIG. 4

The CU sends IAB link control information — S501

The CU receives feedback information corresponding to the IAB link control information — S502

FIG. 5

An IAB MT or an IAB DU receives routing information — S701

The IAB MT or the IAB DU updates a route — S702

The communication node acquires that the link failure occurs to the upstream IAB node or the upstream IAB node is executing the link migration/adjustment    S1301

The communication node sends the link state indication information to the donor CU    S1302

The communication node acquires that the link failure occurs to the upstream IAB node or the upstream IAB node is executing the link migration/adjustment    S1501

The communication node sends the link state indication information to the child IAB    S1502

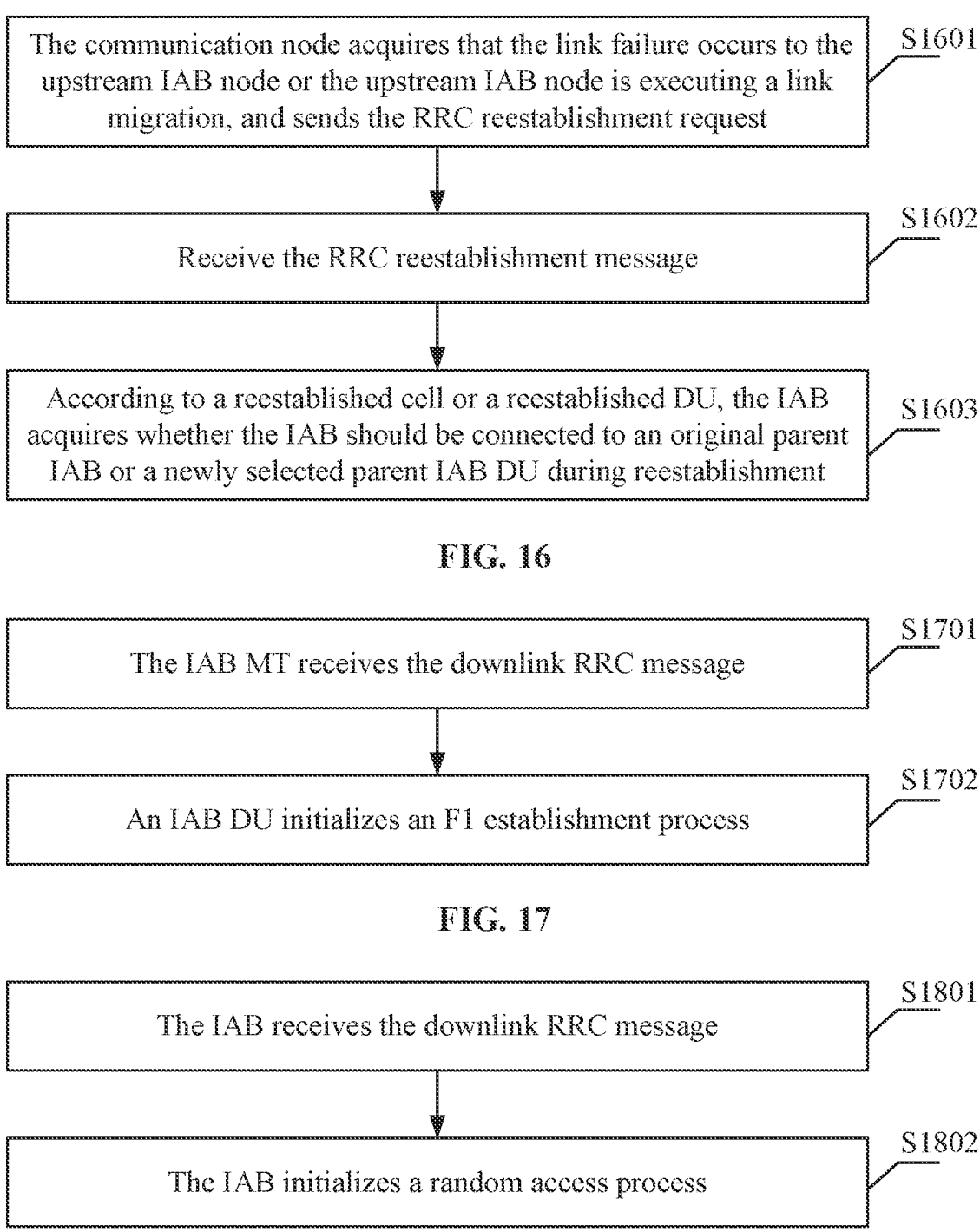

S1601 — The communication node acquires that the link failure occurs to the upstream IAB node or the upstream IAB node is executing a link migration, and sends the RRC reestablishment request S1602 — Receive the RRC reestablishment message S1603 — According to a reestablished cell or a reestablished DU, the IAB acquires whether the IAB should be connected to an original parent IAB or a newly selected parent IAB DU during reestablishment

FIG. 16

S1701 — The IAB MT receives the downlink RRC message

S1702 — An IAB DU initializes an F1 establishment process

FIG. 17

S1801 — The IAB receives the downlink RRC message

S1802 — The IAB initializes a random access process

FIG. 18

IAB LINK CONTROL METHOD, COMMUNICATION UNIT AND COMPUTER READABLE STORAGE MEDIUM

CROSS REFERENCE TO RELATED APPLICATIONS

This application is a national stage application filed under 35 U.S.C. 371 based on International Patent Application No. PCT/CN2020/075208, filed on Feb. 14, 2020, which claims priority to Chinese patent application No. 201910115200.4 filed with the CNIPA on Feb. 14, 2019, the disclosures of which are incorporated herein by reference in their entireties.

TECHNICAL FIELD

The present disclosure relates to, but is not limited to, the technical field of communications and, in particular, relates to, but is not limited to, an integrated access backhaul (IAB) link control method, a communication unit, and a computer-readable storage medium.

BACKGROUND

In order to improve network capacity and coverage and to meet the requirements of cell deployment flexibility, a relay link supporting radio backhaul transmission to implement dense-network deployment is proposed in related art. The node that supports the relay function is called a relay node (RN). The RN provides a user equipment (UE) accessed the cell of the RN with functions and services similar to the ordinary evolved node base station (eNB). A radio interface between the RN and the UE is called access link (AL). The RN accesses an eNB serving the RN through the wireless interface in a way similar to an ordinary UE. The eNB that serves RN is called a donor eNB (DeNB). The radio interface between the RN and the DeNB is called Backhaul Link.

As the future communications technology supports larger bandwidth and supports larger-scale multi-antenna or multi-beam transmission, convenient conditions are provided for the achievement of such backhaul link and access link sharing the relay of air interface resource, which is called Integrated Access Backhaul (IAB). To further improve the flexibility of the deployment, the ordinary IAB does not need to be directly connected to core network. Only an IAB donor is directly connected to the core network. Therefore, the ordinary IAB can communicate with the core network only by transmitting data to the IAB donor.

To further improve the flexibility of the deployment, with reference to FIG. 1, FIG. 1 is a schematic diagram illustrating a link in which an IAB node as a relay in the related art of the present application, an IAB can transmit data to the IAB donor via multiple IABs as relays. IAB is hierarchical. The so-called IAB level represents the IAB hops for the IAB transmission to reach the IAB donor. Assuming that the level of the donor IAB is 0, and the level of the IAB into which the UE accesses is N, then the transmission path between the UE and the core network is the IABs of the level 1, 2, . . . N in sequence. It is assumed that the procedure of establishing a connection between an IAB and another IAB is similar to the procedure of establishing a connection between a UE and a base station, then an IAB of level n+1 is a UE for an IAB of level n, and in other words, the IAB of level n is a serving cell for the IAB of level n+1. If the IAB of level n+1 is connected to the IAB of level n through a Uu port in the way of a UE, the IAB of level n is called a parent node for the IAB of level n+1, and the IAB of level n+1 is a child node for the IAB of level n. Each IAB can select to access one or more parent nodes.

In the related art, when the link communication between a relay node and a service node of the relay node is interrupted due to poor link state or congestion and the like, an interruption delay is very long, which may not satisfy the delay requirements of a service traffic.

SUMMARY

Embodiments of the present disclosure provide an IAB link control method, a communication unit, and a computer-readable storage medium to mainly solve the technical problem that when the link communication between a relay node and a service node of the relay node is interrupted due to poor link state or congestion and the like, the interruption delay is very long.

To solve the preceding technical problem, an embodiment of the present disclosure provides an IAB link control method. The method includes the steps described below.

A communication unit receives control information sent by a centralized unit (CU).

An operation corresponding to the control information is executed according to the control information.

The communication unit includes at least one of an IAB, a terminal, a distributed unit (DU), a terminal part of an IAB, a DU part of an IAB, or a relay.

An embodiment of the present disclosure further provides a communication unit. The communication unit includes a reception module and an operation module.

The reception module is configured to receive control information sent by a CU.

The operation module is configured to execute an operation corresponding to the control information according to the control information.

An embodiment of the present disclosure further provides a communication unit. The communication unit includes a first processor, a first memory and a first communication bus.

The first communication bus is configured to implement connection and communication between the first processor and the first memory.

The first processor is configured to execute one or more computer programs stored in the first memory to implement at least one step of the IAB link control method described above.

An embodiment of the present disclosure provides an IAB link control method. The method includes steps described below.

An IAB acquires that a link failure occurs to an upstream IAB of the IAB or an upstream IAB of the IAB is executing a link migration/adjustment.

The IAB sends link state indication information to a donor CU or a child IAB.

An embodiment of the present disclosure further provides a communication unit. The communication unit includes an acquirement module and a sending module.

The acquirement module is configured to acquire that a link failure occurs to an upstream IAB of the IAB or an upstream IAB of the IAB is executing a link migration/adjustment.

The sending module is configured to send link state indication information to a donor CU or a child IAB.

An embodiment of the present disclosure further provides a communication unit. The communication unit includes a second processor, a second memory and a second communication bus.

The second communication bus is configured to implement connection and communication between the second processor and the second memory.

The second processor is configured to execute one or more computer programs stored in the second memory to implement at least one step of the IAB link control method described above.

An embodiment of the present disclosure provides an IAB link control method. The method includes steps described below.

An IAB acquires that a link failure occurs to an upstream IAB of the IAB or an upstream IAB of the IAB is executing a link migration/adjustment.

A radio resource control (RRC) reestablishment request is sent to a donor CU.

An RRC reestablishment message is received.

An embodiment of the present disclosure further provides a communication unit. The communication unit includes an acquirement module, a sending module and a reception module.

The acquirement module is configured to acquire that a link failure occurs to an upstream IAB of the IAB or an upstream IAB of the IAB is executing a link migration.

The sending module is configured to send link state indication information to a donor CU or a child IAB.

The reception module is configured to receive an RRC reestablishment message.

An embodiment of the present disclosure further provides a communication unit. The communication unit includes a third processor, a third memory and a third communication bus.

The third communication bus is configured to implement connection and communication between the third processor and the third memory.

The third processor is configured to execute one or more computer programs stored in the third memory to implement at least one step of the IAB link control method described above.

An embodiment of the present disclosure provides an IAB link control method. The method includes steps described below.

A CU sends IAB link control information.

The CU receives feedback information corresponding to the IAB link control information.

An embodiment of the present disclosure further provides a communication unit. The communication unit includes a sending module and a reception module.

The sending module is configured to send IAB link control information.

The reception module is configured to receive feedback information corresponding to the IAB link control information.

An embodiment of the present disclosure further provides a communication unit. The communication unit includes a fourth processor, a fourth memory and a fourth communication bus.

The fourth communication bus is configured to implement connection and communication between the fourth processor and the fourth memory.

The fourth processor is configured to execute one or more computer programs stored in the fourth memory to implement at least one step of the IAB link control method described above.

An embodiment of the present disclosure further provides a computer-readable storage medium. The computer-readable storage medium stores one or more programs executable by one or more processors to implement the steps of the IAB link control method of any embodiment above.

The present application has the beneficial effects described below.

According to the IAB link control method, the communication unit and the computer-readable storage medium provided by the embodiments of the present disclosure, the communication unit receives the control information sent by the CU, and the operation corresponding to the control information is executed according to the control information, where the communication unit includes at least one of the IAB, the terminal, the DU, the terminal part of the IAB, the DU part of the IAB, or a relay. That is, in the embodiments of the present disclosure, the communication unit performs a corresponding control operation on the IAB link according to the control information sent by the CU, so as to reduce the interruption delay.

Other features of the present application and the corresponding beneficial effects are set forth later in the description, and it is to be understood that at least part of the beneficial effects become apparent from the description of the present application.

BRIEF DESCRIPTION OF DRAWINGS

FIG. 1 is a schematic diagram illustrating a link in which an IAB node as a relay in the related art of the present application;

FIG. 2 is a flowchart of an IAB link control method according to embodiment one of the present disclosure;

FIG. 3 is a flowchart of an IAB link control method according to embodiment two of the present disclosure;

FIG. 4 is a flowchart of an IAB link control method according to embodiment three of the present disclosure;

FIG. 5 is a flowchart of an IAB link control method according to embodiment four of the present disclosure;

FIG. 16 is a flowchart of an IAB link control method according to embodiment ten of the present disclosure;

FIG. 17 is a flowchart 1 of an IAB link control method according to embodiment eleven of the present disclosure;

FIG. 18 is a flowchart 2 of an IAB link control method according to embodiment eleven of the present disclosure;

DETAILED DESCRIPTION

Figure 6:
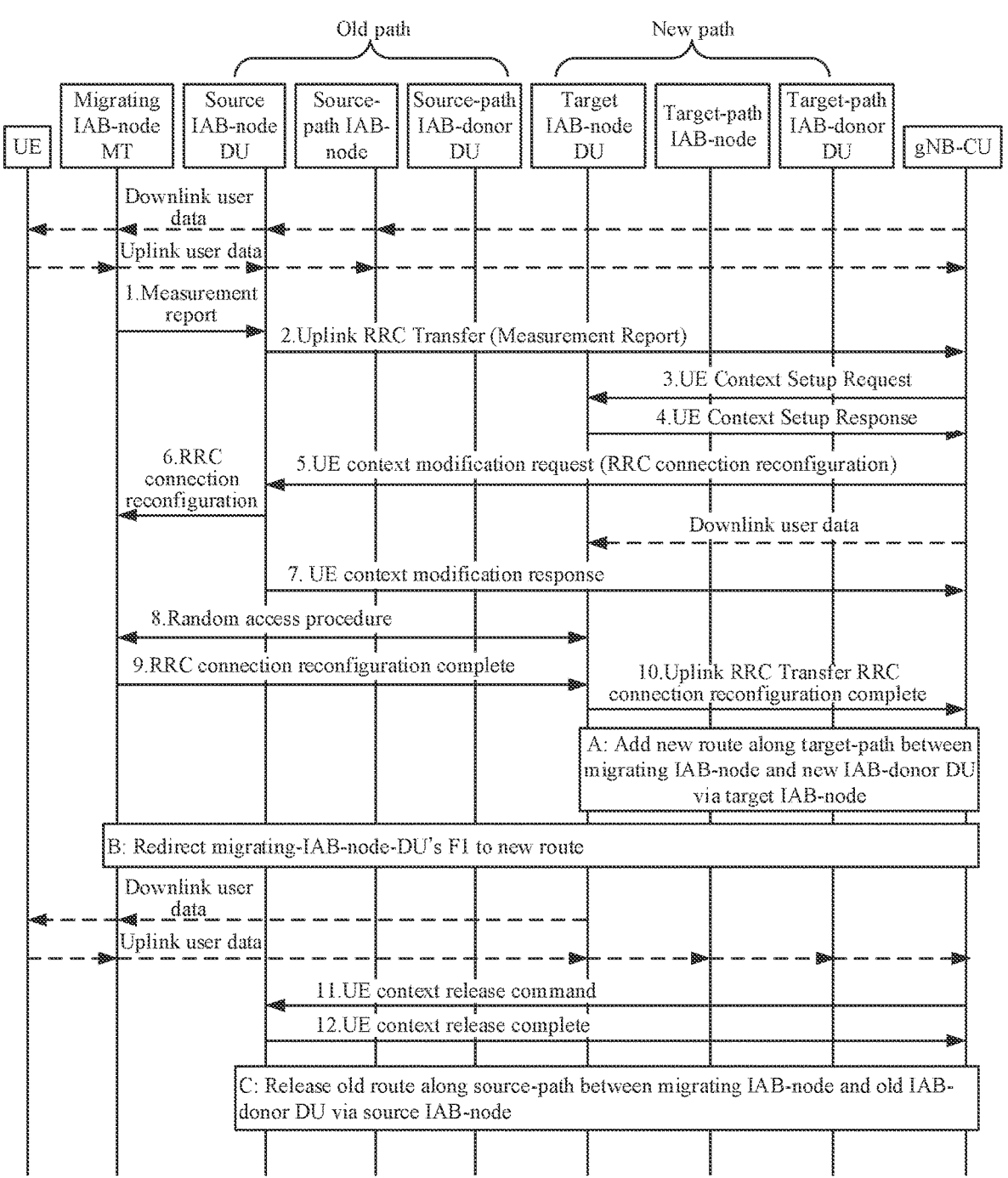
FIG. 6 is a schematic diagram of a handover flow of an IAB node according to embodiment five of the present disclosure.

Embodiments of the present disclosure are described below in detail in conjunction with the drawings and specific implementations. The embodiments described herein are intended to explain the present application and not to limit the present application.

Embodiment One

When the link communication between a relay node and a service node of the relay node is interrupted due to poor link state or congestion and the like, the related mechanism can only reestablish the flow by a reestablishment flow, but an interruption delay caused is very long, which may not satisfy the delay requirements of a service traffic. An embodiment of the present disclosure provides an IAB link control method. With reference to FIG. 2, the IAB link control method includes steps described below.

In S201, a communication unit receives control information sent by a CU.

In the embodiment of the present disclosure, the communication unit includes at least one of an IAB, a terminal, a DU, a terminal part of an IAB, a DU part of an IAB, or a relay. For example, when the control information includes routing information, the communication unit includes the terminal, the terminal part of the IAB, or the DU part of the IAB. In the embodiment of the present disclosure, for ease of understanding, when the control information includes the routing information, the communication unit includes the IAB as an example.

When the IAB has multiple links connected to a donor CU, if a link migration occurs to a certain parent IAB of one link, service data of the IAB may be transmitted through another link. At this time, an IAB (mobile terminal) MT or an IAB DU may determine whether to replace route transmission data according to the route information sent by the donor CU, that is, the IAB receives the control information sent by the centralized unit (CU). It is to be noted that in the embodiment of the present disclosure, the routing information includes at least one piece of routing list information, and the at least one piece of routing list information includes at least one of the following:

1. The routing information includes a target node identifier and a next hop node identifier. The donor CU indicates the target node identifier of a link in which an IAB being switched is located and the next hop node identifier of the IAB in the link. After the IAB updates a route according to the routing information, the IAB can determine the link being switched and decide whether to stop using the route being switched.

2. The routing information further includes a target node identifier, a next hop node identifier and cost information. The donor CU configures cost information for each link of the IAB, for example, cost information a is configured for a link undergoing a link migration, and cost information b is configured for another link (a>b). Since the cost information of the link undergoing the link migration is higher, the IAB temporarily selects the link transmission of the cost information in order to reduce the transmission cost after the route is updated according to the routing information.

In some embodiments of the present application, when the IAB has multiple links connected to the donor CU, if the IAB receives a message sent by a child IAB of the IAB, the IAB can determine which link to forward the message according to the routing information sent by the donor CU. At this time, the routing information includes at least one piece of routing list information, and the at least one piece of routing list information may include a route identity (ID), a target identifier, a next hop node identifier and other contents for indicating a route, as shown in Table 1.

TABLE 1

| Route ID | Target identifier | Next hop node identifier |
|---|---|---|
| 1 | Donor CU or donor DU IP address | Parent DU identifier |
| 2 | . . . | . . . |

In some embodiments, the at least one piece of routing list information may also include the route ID, a UE identifier, a bearer identifier, the target identifier and the next hop node identifier, as shown in Table 2.

TABLE 2

| Route ID | UE identifier | Bearer identifier | Target identifier | Next hop node identifier |
|---|---|---|---|---|
| 1 | Null | Null | Donor CU or donor DU IP address | Parent DU identifier |
| 2 | UE identifier | Bearer identifier | Donor CU or donor DU IP address | Parent DU identifier |
| . . . | | | | |

In the embodiment of the present disclosure, the at least one piece of routing list information further includes routing configuration information and routing state information used for indicating a route state, where the routing state information includes at least one of deactivation, activation, unavailability, availability, switching or link failure. The routing configuration information includes at least one of route priority information, a default route identifier/index or a highest-priority route identifier/index. For example, when the routing configuration information includes the route priority information, as shown in Table 1, if a route list includes the route ID1 and the route ID2, the routing priority information is that a priority of the route ID1 is higher than that of the route ID2, and the default route identifier/index refers to a route by which the IAB transmits data by default.

In some embodiments of the present application, the routing configuration information may also include the at least one piece of routing list information in order from high to low or from low to high. For example, assuming that route ID1 has the highest priority in the table 1, the route ID1 is ranked as a first column.

In some embodiments of the present application, a default route or a highest priority route may also be directly designated for the IAB in the routing configuration information. For example, in the embodiment of the present disclosure, a protocol stipulates that a first route ID is the default route, so that the routing configuration information includes a first or last route of the at least one piece of routing list information to be the default route or the highest priority route. Of course, in the embodiment of the present disclosure, the donor CU can also indicate the default route or the highest priority route through a downlink RRC message.

In S202, an operation corresponding to the control information is executed according to the control information.

When the control information includes the routing information, executing the operation corresponding to the control information according to the control information includes: The communication unit updates a route according to the routing information. It can be understood that when the IAB can determine which link to forward the message according to the routing information sent by the donor CU, the IAB updates a route of the IAB itself according to the routing information in a case of receiving the routing information. Furthermore, the IAB can select a route corresponding to the routing information to transmit data.

It is worth noting that after the IAB receives an RRC connection establishment request message, the RRC connection establishment request message is transmitted through the default route or the highest priority route. For example, when the IAB receives the RRC connection establishment request message sent by the UE or the IAB MT, the IAB forwards the RRC connection establishment request message to the donor CU through the default route. After the donor CU receives the RRC connection establishment request message, the donor CU sent the RRC connection establishment request message to the UE or the IAB MT.

It is worth noting that the routing information is sent to the IAB node through an RRC connection reconfiguration message or an F1 UE context adjustment message.

In the embodiment of the present disclosure, when a parent IAB of the IAB resumes work after handover, the IAB may need to switch back again according to a result of a measurement report, which also increases the signaling overhead of the network. Therefore, it is considered that the parent IAB of the IAB is not replaced, after the current parent IAB completes the handover and is enabled to have a DU function, the IAB continues to connect to the original parent IAB through a handover flow. It is worth noting that the donor CU needs to send the RRC reconfiguration message before the parent IAB handover is completed, for the IAB, a target parent IAB DU function is not started to work at this time, and the RRC reconfiguration message is determined by the target donor CU and the target DU. Since the target DU is not changed, reconfiguration information determined by the DU may remain unchanged, and configuration information determined by the CU is sent through the RRC reconfiguration message. If a migrating IAB still transmits a master information block (MIB) and a synchronization signal during handover, the child IAB can continue to be connected to the migrating IAB. When the migrating IAB completes handover, and an F1 connection is established and a DU function starts working, the target CU sends new RRC configuration information through the RRC message, after the child IAB acquires that the parent migrating IAB handover is completed, an RRC reconfiguration completion message is sent to the target CU, then the DU of the child IAB establishes the F1 connection with the target CU, the DU function starts working, and so on. A child IAB of next layer continues to complete handover until all related downstream IAB finish handover. Therefore, the step in which the communication unit receives the control information sent by the CU includes that the IAB MT receives a downlink RRC message. Executing the operation corresponding to the control information according to the control information includes the IAB DU initializing an F1 establishment procedure.

It is worth noting that the RRC message includes at least one of information indicating that the CU is updated, F1 interface reestablishment indication information, identifier information of the CU or internet protocol (IP) information of the CU, bearer suspension indication information, or subframe configuration information. The subframe configuration information includes at least one of subframe configuration information, slot configuration information, symbol configuration information, subframe pattern configuration information, slot pattern configuration information, symbol pattern configuration information, TDD-UL-DL-ConfigDedicated, slotSpecificConfigurations, subframeConfigPatternFDD, subframeConfigPatternTDD, slotConfigPatternFDD or slotConfigPatternTDD.

The subframe configuration information includes at least one of: a number of subframes used for downlink, a number of subframes available for downlink, a number of subframes available for downlink or uplink, a number of subframes used for uplink, a number of subframes available for uplink or a number of disabled (unusable) subframes.

The slot configuration information includes at least one of: a number of slots used for downlink, a number of slots available for downlink, a number of slots available for downlink or uplink, a number of slots used for uplink, a number of slots available for uplink or a number of disabled (unusable) slots.

The symbol configuration information includes at least one of: a number of symbols used for downlink, a number of symbols available for downlink, a number of symbols available for downlink or uplink, a number of symbols used for uplink, a number of symbols available for uplink or a number of disabled (unusable) symbols.

The subframe pattern configuration information includes at least one of a subframe pattern used for downlink, a subframe pattern available for downlink, a subframe pattern available for downlink or uplink, a subframe pattern used for uplink, a subframe pattern available for uplink or a disabled (unusable) subframe pattern.

The slot pattern configuration information includes at least one of a slot pattern used for downlink, a slot pattern available for downlink, a slot pattern available for downlink or uplink, a slot pattern used for uplink, a slot pattern available for uplink or a disabled (unusable) slot pattern.

The symbol pattern configuration information includes at least one of a symbol pattern used for downlink, a symbol pattern available for downlink, a symbol pattern available for downlink or uplink, a symbol pattern used for uplink, a symbol pattern available for uplink or a disabled (unusable) symbol pattern.

In some embodiments, the above downlink RRC message may be carried in an RRC reconfiguration message, an RRC downlink configuration message associated with the IAB, or an RRC reconfiguration message of the relay.

In the embodiment of the present disclosure, if the migrating IAB stops sending a downlink signal in the handover procedure, the child IAB cannot detect the migrating IAB, continuously attempts to initiate a random access function according to a handover indication, and can re-access to the target CU until the migrating IAB resumes work. To avoid the invalid random access attempt, the step in which the communication unit receives the control information sent by the CU includes that the communication unit receives the downlink RRC message; executing the operation corresponding to the control information according to the control information includes initializing a random access procedure by the communication unit.

It is worth noting that the downlink RRC message includes at least one of: identifier information of the DU, identifier information of the CU, information indicating that the CU is updated, configuration information of a service cell, a first timer timeout time for indicating that a random access flow is executed after timeout, a second timer timeout time for indicating that an RRC reestablishment flow is executed after timeout, a terminal identifier for indicating identifier information after a new CU is accessed, random access configuration information, subframe configuration information shared by cells, UE-specific subframe configuration information or IAB-specific subframe configuration information, system information block 1 (SIB1), or a cell-specific uplink and downlink resource configuration and/or a UE-specific uplink and downlink resource configuration.

The subframe configuration information includes at least one of subframe configuration information, slot configuration information, symbol configuration information, subframe pattern configuration information, slot pattern configuration information, symbol pattern configuration information, TDD-UL-DL-ConfigDedicated, slotSpecific-Configurations, subframeConfigPatternFDD, subframeConfigPatternTDD, slotConfigPatternFDD or slotConfigPatternTDD.

The subframe configuration information includes at least one of: the number of subframes used for downlink, the number of subframes available for downlink, the number of subframes available for downlink or uplink, the number of subframes used for uplink, the number of subframes available for uplink or the number of disabled (unusable) subframes.

The slot configuration information includes at least one of: the number of slots used for downlink, the number of slots available for downlink, the number of slots available for downlink or uplink, the number of slots used for uplink, the number of slots available for uplink or the number of disabled (unusable) slots.

The symbol configuration information includes at least one of: the number of symbols used for downlink, the number of symbols available for downlink, the number of symbols available for downlink or uplink, the number of symbols used for uplink, the number of symbols available for uplink or the number of disabled (unusable) symbols.

The subframe pattern configuration information includes at least one of the subframe pattern used for downlink, the subframe pattern available for downlink, the subframe pattern available for downlink or uplink, the subframe pattern used for uplink, the subframe pattern available for uplink or the disabled (unusable) subframe pattern.

The slot pattern configuration information includes at least one of the slot pattern used for downlink, the slot pattern available for downlink, the slot pattern available for downlink or uplink, the slot pattern used for uplink, the slot pattern available for uplink or the disabled (unusable) slot pattern.

The symbol pattern configuration information includes at least one of the symbol pattern used for downlink, the symbol pattern available for downlink, the symbol pattern used for downlink or uplink, the symbol pattern used for uplink, the symbol pattern available for uplink or the disabled (unusable) symbol pattern.

In some embodiments, the above RRC message may be carried in the RRC reconfiguration message, or the RRC configuration message associated with the IAB, or the RRC reconfiguration message of the relay.

In the embodiment of the present disclosure, the step in which the communication unit receives the control information sent by the CU includes that the communication unit receives the F1 message sent by the CU. Executing the operation corresponding to the control information according to the control information includes that the communication unit initializes an F1 establishment procedure or the communication unit sending an F1 connection establishment request.

It is to be noted that the F1 message includes at least one of: an F1 connection release message, an F1 reestablishment message, an F1 reestablishment request message, or an F1 establishment request message.

In some embodiments, the F1 message further includes an identifier of a target CU or an IP address of a target CU.

It is to be noted that in the embodiment of the present disclosure, when the control information includes a downlink RRC message, the communication unit includes, but is not limited to, the UE or the IAB MT. In the embodiment of the present disclosure, when a radio link failure (RLF) occurs to the UE or the IAB or the parent IAB of the IAB, the donor CU may control handover of the UE or IAB and initiate the random access to the target cell according to a candidate parent IAB configured for the UE or IAB in advance. At this time, the step in which the communication unit receives the control information sent by the CU includes that the communication unit receives the downlink RRC message. Executing the operation corresponding to the control information according to the control information includes that the communication unit initializes the random access procedure in a case of satisfying an event triggering a condition handover.

In this embodiment, for ease of understanding, the communication unit is the IAB by way of example in this embodiment. When the RLF occurs to the IAB node or the IAB node acquires that the RLF occurs to the parent IAB of the IAB node, the IAB node may report a measurement report to the donor CU, the donor CU sends the downlink RRC message to the IAB node, and the IAB receives the downlink RRC message. The downlink RRC message includes condition handover configuration information, the condition handover configuration information includes at least one of: target cell configuration information including a target cell identifier, a new terminal identifier (radio network temporary identity (RNTI)-Value), random access configuration information, handover condition configuration information, or random access condition configuration information. The handover condition configuration information or the random access condition configuration information includes event information triggering a condition handover.

In the embodiment of the present disclosure, the event information triggering the condition handover includes at least one of: an RLF occurring to a link (for example, the RLF occurs to the IAB node and the donor CU), a T310 timer of a primary service cell (PCell) times out, receiving a random access issue indication of a media access control (MAC), a radio link control (RLC) protocol indicating that a maximum number of retransmissions is reached, an RLF occurring to a Parent IAB of the IAB node, an RLF occurring to an upstream node of the IAB node (for example, the RLF occurs to a parent IAB of the parent IAB of the IAB node), an RRC release occurring to a current link of the IAB node and the donor CU, or a data inactivity timer timing out.

The IAB or the UE receives the RRC message, acquires the condition handover configuration information from the RRC message, and determines whether a condition triggering the condition handover in the handover condition indication information is satisfied according to the condition handover configuration information.

Embodiment Two

After an IAB node acquires that an RLF occurs to one parent IAB node, the IAB can inform a current link state to a donor CU or a child IAB, so as to acquire the current link state by the donor CU or the child IAB and update the route. The embodiment of the present disclosure further provides an IAB link control method. As shown in FIG. 3, the IAB link control method includes steps described below.

In S301, the IAB acquires that a link failure occurs to an upstream IAB of the IAB or an upstream IAB of the IAB is executing a link migration/adjustment.

In the embodiment of the present disclosure, the IAB node may acquire, according to the information indicating that the RLF occurring to a parent IAB of the IAB node, that the link failure occurs to the upstream IAB or the upstream IAB of the IAB is executing the link migration/adjustment. In some embodiments, since the RLF occurs to the parent IAB of the IAB node or the parent IAB of the IAB node is executing the link migration, the parent IAB of the IAB node stops service, and the IAB node may also detect that the RLF occurs to the parent IAB of the IAB node.

In S302, the IAB sends link state indication information to a donor CU or a child IAB.

In the embodiment of the present disclosure, the link state indication information includes at least one of: a link identifier or a route identifier, an identifier of an IAB node to which the link failure or the link migration occurs, a link failure cause, or a link state type, where the link failure cause includes, but not limited to a parent IAB link failure, a master cell group (MCG) link failure and a secondary cell group (SCG) link failure, and the link state type includes the link failure and the link migration.

In some embodiments, the link failure indication information is sent and carried through an IAB link state message, a CG Failure Information message, an RRC uplink message, or an uplink MAC control element (CE) message, and is further sent to the donor CU, and the donor CU determines an updated route configuration according to the link state indication information. It is to be understood that when the IAB sends the link state indication information to the donor CU, the IAB node may include one or more parent IABs. After the IAB acquires that the link failure occurs to one parent IAB or one parent IAB is executing the link migration/adjustment, the link state indication information is sent to the donor CU through another parent IAB.

In some embodiments of the present application, the link failure indication information is sent to the child IAB through control information of a control layer or the MAC CE. In some embodiments of the present application, the IAB sends the link state indication information to the child node of the child IAB, and may determine whether to inform the link state indication information to the child IAB according to the link condition of the child IAB. In a case where the child IAB has multiple connections, for example, a child IAB6 has a route 1 relationship of IAB7-IAB6-IAB5-IAB4-donor DU-donor CU and a route 2 relationship of IAB7-IAB6-IAB3-donor DU-donor CU, the child IAB6 may quickly resume connection through a route 2 without continuing to send the link state indication information of the child IAB6 to a child IAB7 of the child IAB6. If the child IAB has a single connection, for example, the child IAB6 only has the route relationship of IAB7-IAB6-IAB5-IAB4-donor DU-donor CU, when the child IAB6 acquires that the RLF occurs to a parent IAB5, the child IAB6 may not be able to resume the connection quickly, and it is necessary to continue to inform the link state indication information to the child IAB7 of the child IAB6.

Embodiment Three

When the IAB acquires that a link failure occurs to a current link or a current link is executing a link migration, in order for an IAB to connect to a donor CU, a link reestablishment is required. Therefore, the embodiment of the present disclosure provides an IAB link control method. As shown in FIG. 4, the IAB link control method includes steps described below.

In S401, the IAB acquires that the link failure occurs to an upstream IAB of the IAB or an upstream IAB of the IAB is executing a link migration/adjustment.

In S402, an RRC reestablishment request is sent to the donor CU.

In S403, an RRC reestablishment message is received.

In the embodiment of the present disclosure, the RRC reestablishment request includes a reestablishment cause, and the reestablishment cause includes that the link failure occurs to the upstream IAB node or the upstream IAB node is executing the link migration/adjustment. It can be understood that the donor CU receives the RRC reestablishment request and issues the RRC reestablishment message to the IAB. The RRC reestablishment message includes a cell identifier or a DU identifier (which is used for indicating a reestablished cell or a reestablished DU), that is, the reestablished cell or the reestablished DU may be determined as an object to be connected for the IAB, and the object to be connected includes an original parent IAB or a newly selected parent IAB DU during reestablishment.

It is worth noting that in the embodiment of the present disclosure, after the IAB receives the RRC reestablishment message, the IAB node determines a target IAB node to be connected according to the reestablished-cell identifier or the reestablished-DU identifier, and the target IAB node includes the original parent IAB or the newly selected parent IAB DU during reestablishment. For example, when the IAB includes a parent IAB1 and a parent IAB2 and an RLF occurs to the parent IAB1, the IAB sends the RRC reestablishment request to the donor CU, and the RRC reestablishment request includes that the RLF occurs to the parent IAB1, the donor CU receives the RRC reestablishment request and send the RRC reestablishment message. The RRC reestablishment message includes a DU identifier of the parent IAB2, which represents that an RRC reestablishment object of the IAB is the parent IAB2, that is, the IAB initiates an RRC connection to the parent IAB2, at this time, the IAB can release the connection with the original parent IAB1 and update a parent IAB2 DU. The RRC reestablishment message includes a DU identifier of the parent IAB1, which represents that the IAB continues to remain the connection with the parent IAB1 and starts the RRC reestablishment.

Embodiment Four

The embodiment of the present disclosure provides an IAB link control method. As shown in FIG. 5, the IAB link control method includes steps described below.

In S501, a CU sends IAB link control information.

In S502, the CU receives feedback information corresponding to the IAB link control information.

In the embodiment of the present disclosure, when a parent IAB of the IAB resumes work after handover, the IAB very likely may need to switch back again according to a result of a measurement report, which also increases the signaling overhead of the network. Therefore, the IAB does not replace the parent IAB, and continues to connect to the original parent IAB through a handover flow after the current parent IAB to complete the handover and is enabled to have a DU function. It is worth noting that since the IAB does not replace the parent IAB, continues to connect to the original parent IAB through the handover flow after the current parent IAB to complete the handover and is enabled to have the DU function, such as, switching from a target CU to a source CU. When the source CU sends a handover request to the target CU, the connection between a handover target DU and a handover target CU is not established, so the source CU needs to send the handover request message to the target CU. Specifically, the handover request message sent by the source CU to the target CU needs to carry context information of all the IABs and a UE to be switched, and a topological relationship between each IAB and a UE or routing information of all UEs.

Therefore, in the embodiment of the present disclosure, the step in which the CU sends the IAB link control information includes that the source CU sends the handover request message, and the step in which the CU receives the feedback information corresponding to the IAB link control information includes that the source CU receives a handover request acknowledgement message.

In the embodiment of the present disclosure, the handover request message includes at least one of: context information of one or more IABs to be switched and context information of a UE, topological information between multiple IABs and a UE, routing information of one or more UEs, multi-communication node handover indication information, group handover indication information, handover communication node identifier information, type information of a handover communication node, or configuration information related to the UE and retained by a CU side, where a type of the handover communication node includes the IAB and the UE. the context information includes at least one of routing information of the UE or routing information of the IAB, Signalling transport network layer (TNL) association address at source NG-C side, protocol data unit (PDU) Session Resources To Be Setup List, or type information (a type in the UE type information includes the IAB and the UE) of the UE.

In some embodiments, the handover request acknowledgement message sent by the target CU to the source CU carries at least PDU Session Resources Admitted List information.

In the embodiment of the present disclosure, the IAB may have multiple links connected to a same donor CU. For example, two parent DUs connected to the IAB belong to the same donor CU. At this time, an IAB type accessing the donor CU includes a UE type, an IAB type and a relay type. Therefore, in order to better acquire the current link state, the donor DU needs to know the IAB type requesting access. At this time, when the step in which the CU sends the IAB link control information includes that the donor CU sends a UE context establishment request message, the step in which the CU receives the feedback information corresponding to the IAB link control information includes that the donor CU receives a UE context establishment response message.

In the embodiment of the present disclosure, the donor CU sends the UE context establishment request message to the donor DU, where the UE context establishment request message includes the UE type information, and the UE type information includes the UE type, the IAB type and the relay type. For example, as shown in FIG. 1, when the UE type requesting access to the donor CU is an IAB 1, the UE context establishment request message includes the relay type; when the UE type requesting access to the donor CU is the UE, the UE context establishment request message includes the UE type; and when the UE type requesting access to the donor CU is an IAB 4, the UE context establishment request message includes the IAB type.

Embodiment Five

As shown in FIG. 6, FIG. 6 is a schematic diagram of a handover flow of an IAB node. The flow includes the steps described below.

In step 1, when a handover occurs to an IAB, a migrating IAB node MT reports a measurement report to a source IAB-node DU, and the measurement report includes at least a link state between the IAB and a donor CU.

In step 2, after the measurement report is received, the source IAB-node DU carries the measurement report to the donor CU for performing an uplink RRC transmission, i.e., informs the link state between the IAB and the donor CU to the donor CU.

In steps 3 and 4, when the donor CU determines to switch the IAB node, the donor CU determines a target IAB-node DU of the IAB node according to the measurement report, and sends a UE context setup request to the target IAB-node DU, and the target IAB-node DU feeds back a UE context setup response to the donor CU.

In steps 5 and 6, after determining the target donor DU of the IAB node, the donor CU sends a UE context modification request to a source IAB-node DU of the IAB node. The UE context modification request carries an RRC connection reconfiguration, and the source IAB-node DU informs the migrating IAB node MT to perform the RRC connection reconfiguration.

In steps 7, 8, 9 and 10, the migrating IAB node MT sends a UE context modification response message to the donor CU, the migrating IAB node MT initiates a random access program to the target IAB-node DU, and then the RRC connection reconfiguration is completed, that is, the IAB node and the target IAB-node DU are successfully connected, and the target IAB-node DU sends the uplink RRC transmission to the donor CU to inform that the RRC connection reconfiguration is completed.

In steps 11 and 12, the donor CU sends a UE context release command to the source IAB-node DU to complete the release of the connection between the source IAB-node DU and the donor CU.

Figure 7:
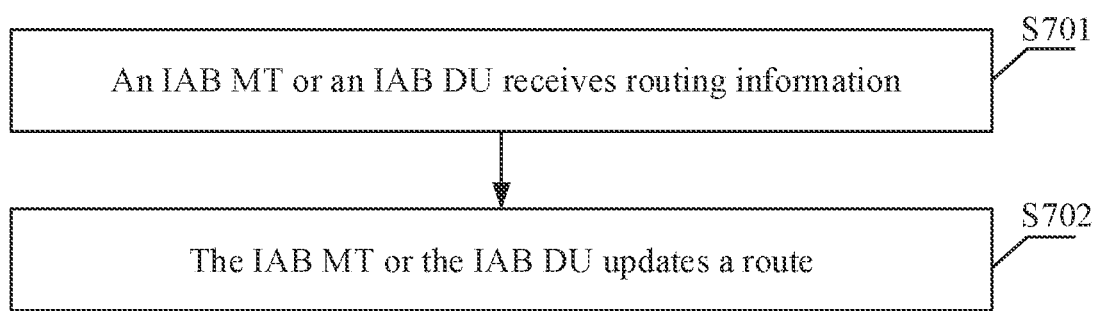
FIG. 7 is a flowchart of an IAB link control method according to embodiment five of the present disclosure.

In the embodiment of the present disclosure, when the handover occurs to the IAB, in the procedure from the migrating IAB node MT receiving the handover indication information to the migrating IAB node completing a new DU configuration (step 6 through step B shown in FIG. 6), the migrating IAB node cannot forward any data for a downstream IAB node (i.e., a child node of the IAB node) and the UE. If the migrating IAB node does not inform child IAB of the migrating IAB node that the migrating IAB node itself is prepared to handover, the migrating IAB node may continue to receive the child IAB. Due to the delay caused by handover, the delay requirement may not be satisfied for some strict latency traffic. Based on the above handover flow, for example, the IAB node has multiple links connected to the donor CU, such as a link 1 of IAB5-IAB3-IAB1-Donor DU1-Donor CU1 and a link 2 of IAB5-IAB3-IAB2-Donor DU2-Donor CU1. When an IAB3 node is undergoing link handover, the parent IAB of the IAB3 node switches from the IAB1 to the IAB2, that is, switches from the link 1 to the link 2, and a traffic of the IAB3 can be transmitted through the link 2. For a child IAB5 of the IAB3 node, the donor CU needs to inform the child IAB5 that a certain parent IAB is being switched, so as to facilitate the child IAB5 to determine whether to replace a route. The embodiment of the present disclosure provides an IAB link control method, as shown in FIG. 7, the method includes steps described below.

In S701, an IAB MT or an IAB DU receives routing information.

In S702, the IAB MT or the IAB DU updates a route.

In the embodiment of the present disclosure, the routing information includes a target node identifier and a next hop node identifier, for example, a target node identifier of the IAB5 is a Donor DU1, and a next hop node identifier of the IAB5 is the IAB3. After the child IAB5 receives the routing information, which link is switched is acquired, and the child IAB5 determines whether to stop using the link being switched according to the link indication information.

In the embodiment of the present disclosure, the routing information includes a target node identifier and a next hop node identifier, and further includes cost matric (cost information). The donor CU may also directly update the cost matric value in a route table of the downstream IAB node (i.e., child IAB5) of the IAB3 node being switched, for example greatly increasing the cost metric of the link transmitted via the IAB node 3, so that the IAB5 with multiple paths temporarily chooses another path for transmission.

In some embodiments, the routing information includes indication information for suspending the use of an interrupted link, that is, indicates that a link of the child IAB5 is suspended to use, and further indicates that the cause of the suspension is that an upstream IAB node (a parent IAB3 node) in the link is switching. It is worth noting that the link indication information may further include a timer. The timer starts after the child IAB5 receives the link indication information for suspending to use, and after the timer times out, the child IAB5 resumes the use of the suspended link.

It can be understood that the IAB3 node and the related child IAB nodes need to suspend data transmission on the path via the IAB3 node during the IAB3 node handover. When the IAB3 node handover is completed, the donor CU can also send notification information to the child IAB5 node of the IAB3 node. For example, for the routing information includes the target node identifier and a next hop node identifier, the notification information notifies the handover of an upstream IAB node (IAB3 node) of the child IAB5 is completed. For the routing information includes the target node identifier, the next hop node identifier and the cost matrix cost information, an appropriate cost metric is reconfigured and the child IAB5 node is notified. For the route information includes the indication information for suspending to use the interrupted link, a certain route is notified to resume use. The corresponding link may resume work.

Embodiment Six

Figure 8:
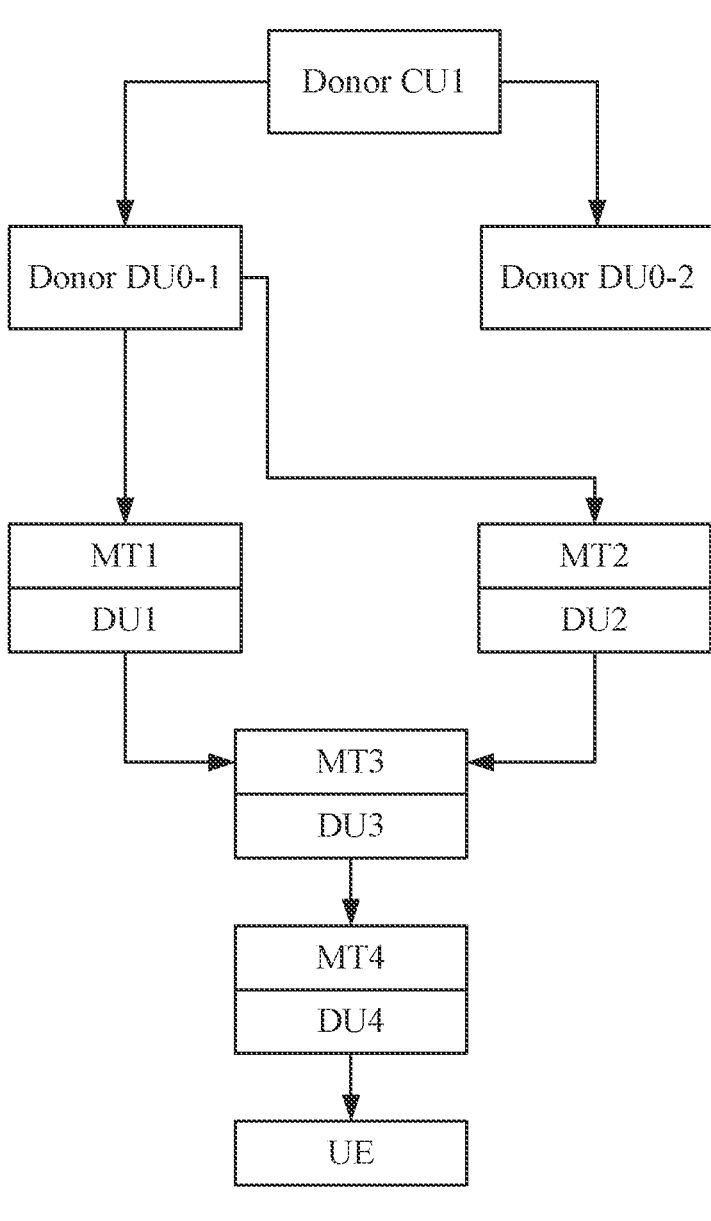
FIG. 8 is a schematic diagram of an IAB link according to embodiment six of the present disclosure.
Figures 9, 10:
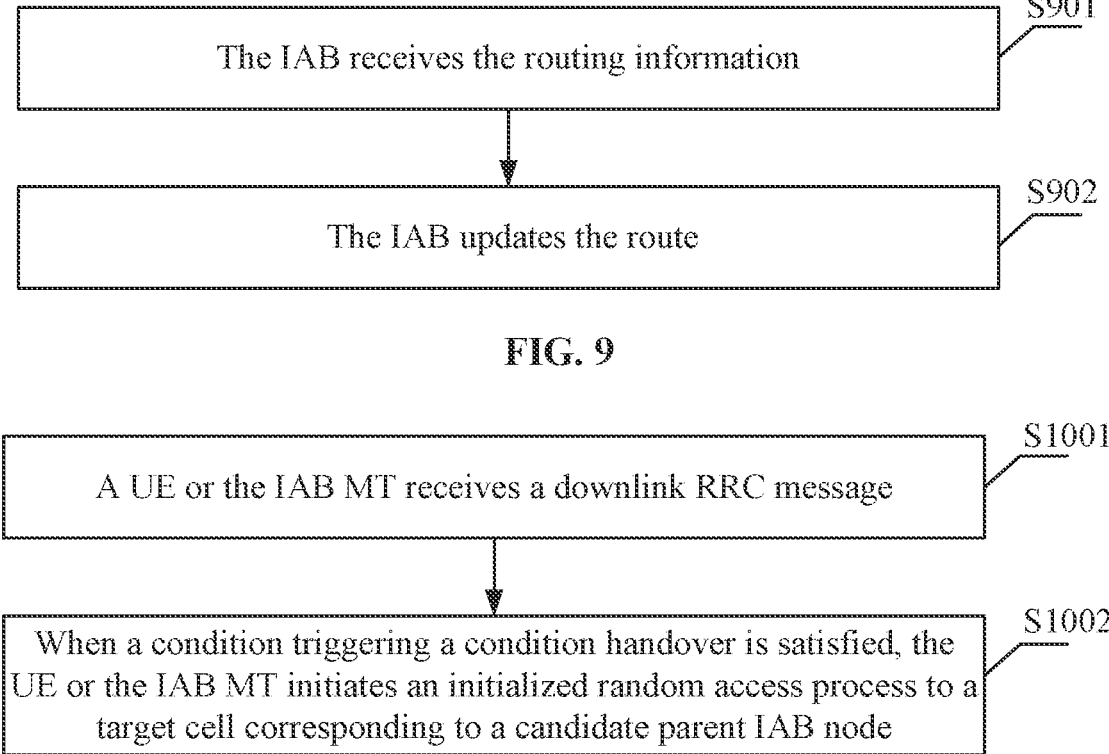
FIG. 9 is a flowchart of an IAB link control method according to embodiment six of the present disclosure.
FIG. 10 is a flowchart of an IAB link control method according to embodiment seven of the present disclosure.

As shown in FIG. 8, in the initial access procedure, assuming that an MT4 sends an RRC connection establishment request message to request access to a donor CU, after receiving a message from the MT4, DU3 may forward the RRC connection establishment request message through a DU1 or a DU2 according to FIG. 8. In some embodiments, the DU3 can determine to use which route to forward the RRC connection establishment request message of a UE or an IAB MT. In the embodiment of the present disclosure, an IAB3 node corresponding to an MT3 can determine to select which route to transmit data according to routing information sent by the donor CU. As shown in FIG. 9, the IAB link control method provided by the embodiment of the present disclosure includes steps described below.

In S901, an IAB receives the routing information.

It is worth noting that the donor CU can configure one piece of routing information for each IAB, and the routing information is sent to the IAB through an RRC connection reconfiguration message or an F1 UE context adjustment message.

In the embodiment of the present disclosure, the routing information includes at least one piece of routing list information, and the at least one piece of routing list information may include content used for indicating content of the route, such as a route ID, a target identifier and a next hop node identifier; the at least one piece of routing list information further includes routing configuration information and routing state information used for indicating a route state, where the routing state information includes at least one of deactivation, activation, unavailability, availability, switching or link failure. The embodiment of the present disclosure takes the route configuration information including route priority information as an example, and a priority of a route ID1 is higher than that of a route ID2. See Table 3.

TABLE 3

| Route ID | Target identifier | Next hop node identifier | Routing configuration information | Routing state information |
|---|---|---|---|---|
| 1 | Donor CU or donor DU IP address 1 | Parent DU identifier 1 | Highest priority | Availability |
| 2 | Donor CU or donor DU IP address 2 | Parent DU identifier 2 | Second highest priority | Activation |

In some embodiments, the routing configuration information may also include at least one of: a default route identifier/index or a highest priority route identifier/index. In some embodiments, the routing configuration information may also include the at least one piece of routing list information in order from high to low or from low to high. In some embodiments, a default route or a highest priority route may also be directly designated for the IAB in the routing configuration information. For example, in the embodiment of the present disclosure, a protocol stipulates that a first route ID is the default route, so that the routing configuration information includes a first or last route of the at least one piece of routing list information to be the default route or the highest priority route. Of course, in the embodiment of the present disclosure, the donor CU can also indicate the default route or the highest priority route the through a downlink RRC message.

In S902, the IAB updates a route.

When the IAB receives the routing information, a route of the IAB is updated according to the routing information, and then the IAB can select route transmission data corresponding to the routing information. When receiving the RRC connection establishment request message sent by the UE or IAB MT4, the IAB DU3 forwards the RRC connection establishment request message to the donor CU through the highest priority route ID1. Therefore, when receiving the RRC connection establishment request message, the donor CU sends the RRC establishment message to the UE or the IAB MT.

Embodiment Seven

It should be understood that when an RLF occurs to an IAB, in order to reduce a reestablishment delay of the IAB, a donor CU can configure one candidate parent IAB for each IAB in advance according to a measurement result reported by the IAB. Considering that a position of the IAB is unchanged, it is unlikely that the candidate parent IAB changes. Even if the IAB does not establish a connection with the candidate parent IAB, it can make preparations in advance. For example, the IAB needs to know to which candidate parent IAB to initiate an RRC reestablishment if a current link is interrupted and cannot work. In order to reduce a random access delay, the candidate parent IAB can also allocate non-competitive random access channel (RACH) resources for the IAB in advance. Of course, according to the change of the measurement report, the candidate parent IAB may be updated, and the RACH resources allocated in advance may be reserved all the time, set to have a certain timeliness, or updated at any time. In some embodiments, when the IAB does not detect an RLF, but the IAB acquires that the RLF occurs to the parent IAB of the IAB, and can also switch to the candidate parent IAB. In order to facilitate the IAB to switch to the candidate parent IAB at an appropriate time, the embodiment provides an IAB link control method. As shown in FIG. 10, the IAB link control method includes steps described below.

In S1001, a UE or an IAB MT receives a downlink RRC message.

In the embodiment of the present disclosure, when the RLF occurs to the IAB node or the IAB node acquires that the RLF occurs to the parent IAB of the IAB node, the IAB node may report a measurement report to the donor CU, the donor CU sends the downlink RRC message to the IAB node, and the IAB receives the downlink RRC message. The downlink RRC message includes condition handover configuration information, the condition handover configuration information includes at least one of: target cell configuration information including a target cell identifier, a new terminal identifier (RNTI-Value), random access configuration information, handover condition information, or random access condition information. The handover condition information or the random access condition information includes event information triggering a condition handover, and the event information triggering the condition handover includes at least one of: an RLF occurring to a link (the RLF occurs to a link between the IAB node and the donor CU), a T310 timer of a PCell timing out, receiving a random access issue indication of an MAC, an RLC protocol indicating that a maximum number of retransmissions is reached, n RLF occurring to a Parent IAB of the IAB node, an RLF occurring to an upstream node of the IAB node (for example, the RLF occurs to a parent IAB of the parent IAB of the IAB node), an RRC release occurring to a current link between the IAB node and the donor CU, or a data inactivity timer timing out.

In S1002, when a condition triggering a condition handover is satisfied, the UE or the IAB MT initiates an initialized random access procedure to a target cell corresponding to the candidate parent IAB node.

The IAB acquires the condition handover configuration information from the RRC message, and determines whether the condition triggering the condition handover in the handover condition indication information is satisfied according to the condition handover configuration information. For example, assuming that the RLF occurs to the Parent IAB of the IAB node, when the IAB node receives the condition handover configuration information, the random access is initiated to the target cell corresponding to the candidate parent IAB node.

It is worth noting that the candidate parent IAB node preconfigured by the donor CU and the IAB node may belong to a same donor CU. In the IAB link control method, a procedure that the IAB node initiates random access to a target cell is specifically shown in FIG. 11.

The IAB node reports the measurement report to the donor CU, the donor CU sends a context setup/modification request to the preconfigured candidate parent IAB node according to the measurement report, the candidate parent IAB node feeds back the context setup/modification response, and then the donor CU sends the condition handover configuration information to the IAB node to make preparations for the IAB node to connect to the candidate parent IAB node.

In steps 1 and 2, assuming that the RLF occurs to the Parent IAB of the IAB node, the Parent IAB of the IAB node reports an RLF report to the donor CU, and sends RLF indication information to the IAB node.

In steps 3 and 4, the donor CU determines the candidate parent IAB of the IAB node, and sends a UE context setup request to the candidate parent IAB. The candidate parent IAB feeds back a UE context setup response to the donor CU.

In steps 5 and 6, the IAB node initiates a random access program to the candidate parent IAB, and then the RRC connection reconfiguration is completed. The candidate parent IAB sends an uplink RRC transmission to the donor CU to inform the RRC connection reconfiguration is completed.

In steps 7 and 8, a new route is configured on a radio backhaul between a migrating IAB node and an IAB donor DU through the target IAB node. The IAB node is redirected to the new route, that is, the IAB node transmits data to the donor CU through the candidate parent IAB.

Figure 11:
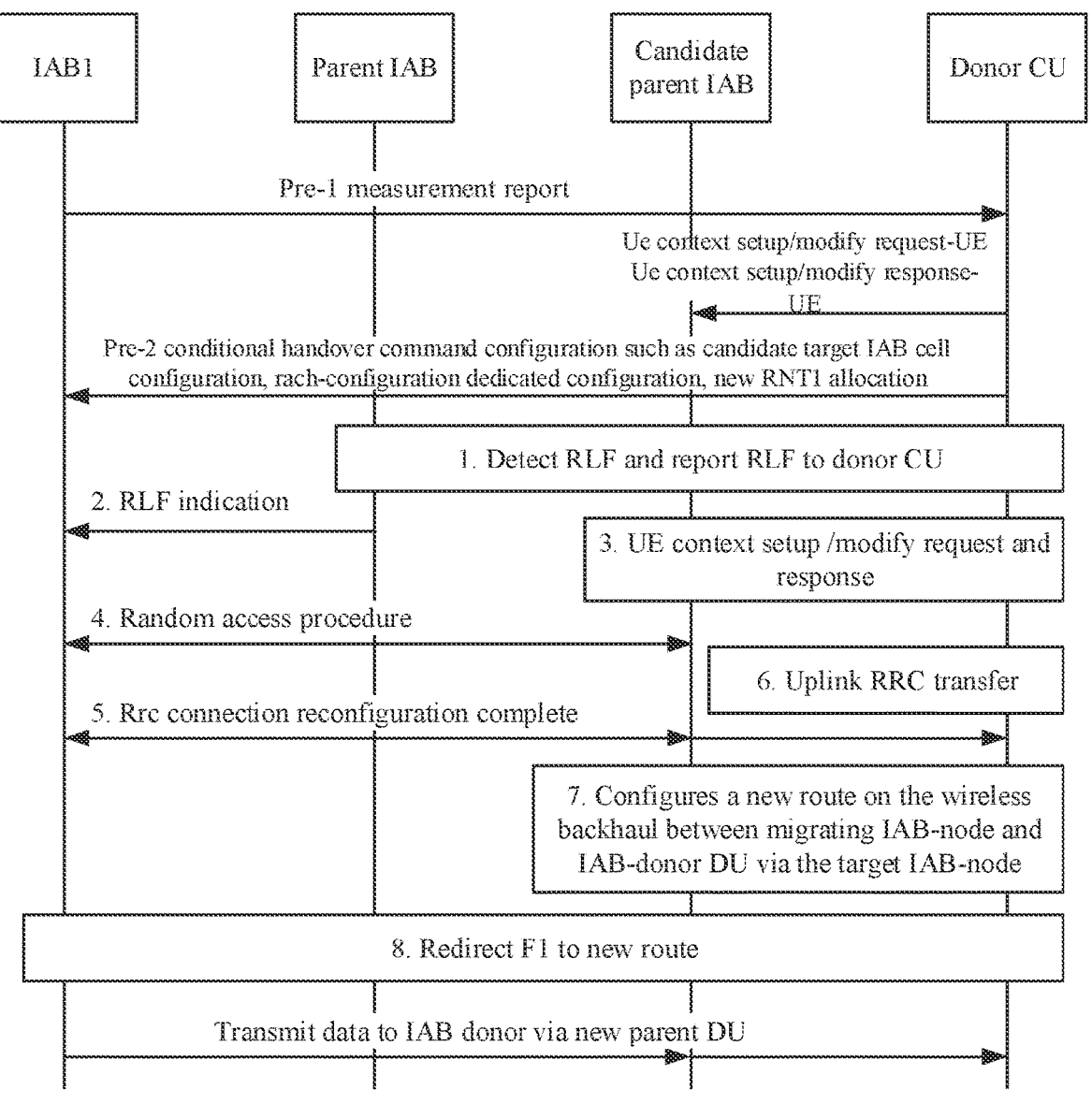
FIG. 11 is a schematic diagram 1 of a handover flow of an IAB node according to embodiment seven of the present disclosure.
Figures 12, 13:
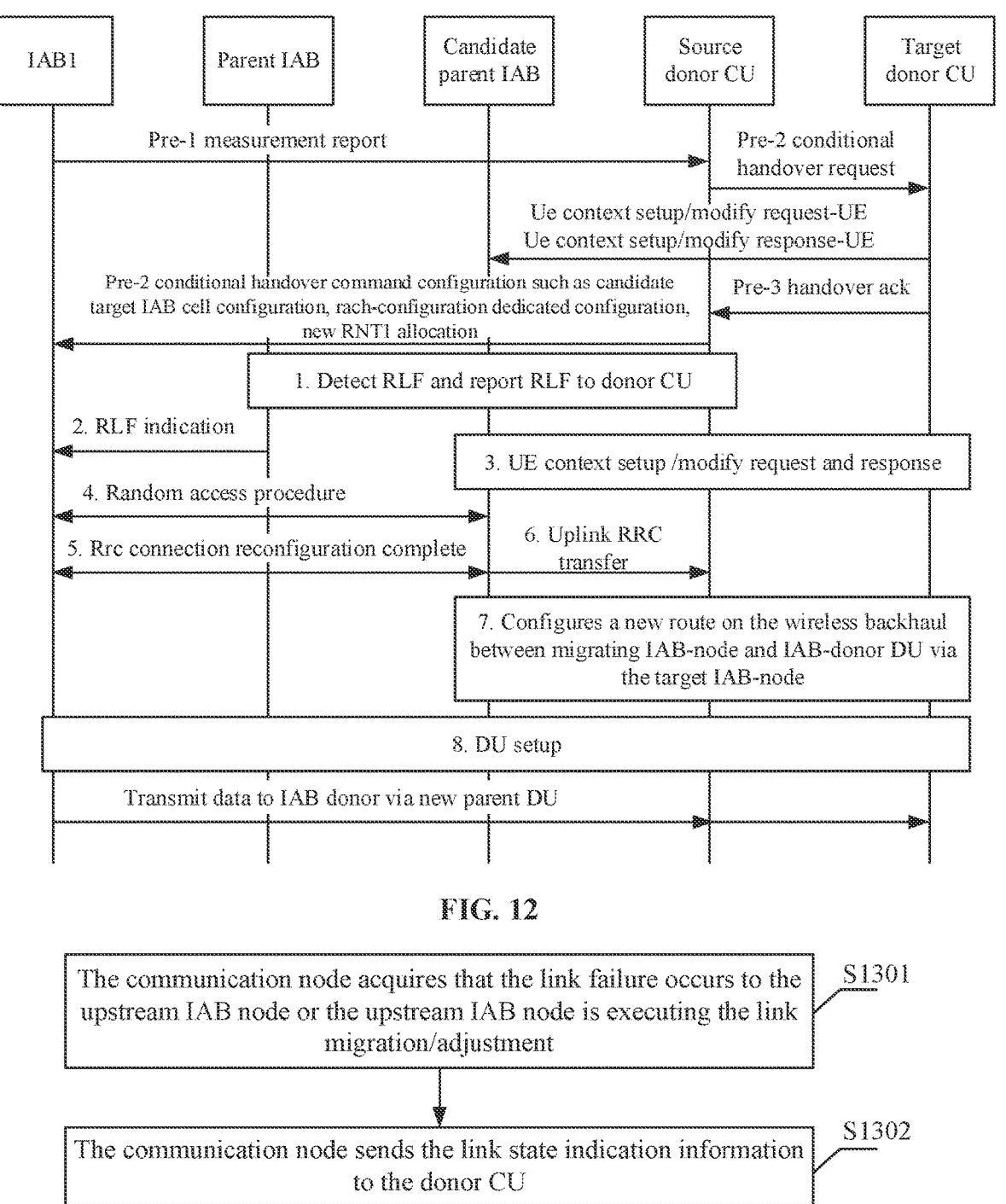
FIG. 12 is a schematic diagram 2 of a handover flow of an IAB node according to embodiment seven of the present disclosure.
FIG. 13 is a flowchart of an IAB link control method according to embodiment eight of the present disclosure.

In some embodiments, when the candidate parent IAB and IAB nodes belong to different donor CUs, compared with the scenario in FIG. 11, it is necessary to add information of interaction between a source donor CU and a target donor CU to which the candidate DU belongs via an Xn interface, as shown in FIG. 12. The IAB node reports the measurement report to the source donor CU, the source donor CU sends a condition handover request to the target donor CU to which the candidate DU belongs, the target donor CU sends a context setup/modification request to the preconfigured candidate parent IAB node and sends a handover acknowledgement message to the source donor CU, and then the donor CU sends the condition handover configuration information to the IAB node to make preparations for the IAB node to connect to the candidate parent IAB node.

Embodiment Eight

The embodiment of the present disclosure provides an IAB link control method. As shown in FIG. 13, the IAB link control method includes steps described below.

In S1301, a communication node acquires that a link failure occurs to an upstream IAB node or an upstream IAB node is executing a link migration/adjustment.

In S1302, the communication node sends link state indication information to a donor CU.

It is worth noting that in the embodiment of the present disclosure, the link state indication information includes at least one of: a link identifier or a route identifier, an identifier of an IAB node to which the link failure or the link migration occurs, a link failure cause or a link state type, where the link failure cause includes, but not limited to a parent IAB link failure, an MCG link failure and an SCG link failure, and the link state type includes the link failure and the link migration.

Figures 14, 15:
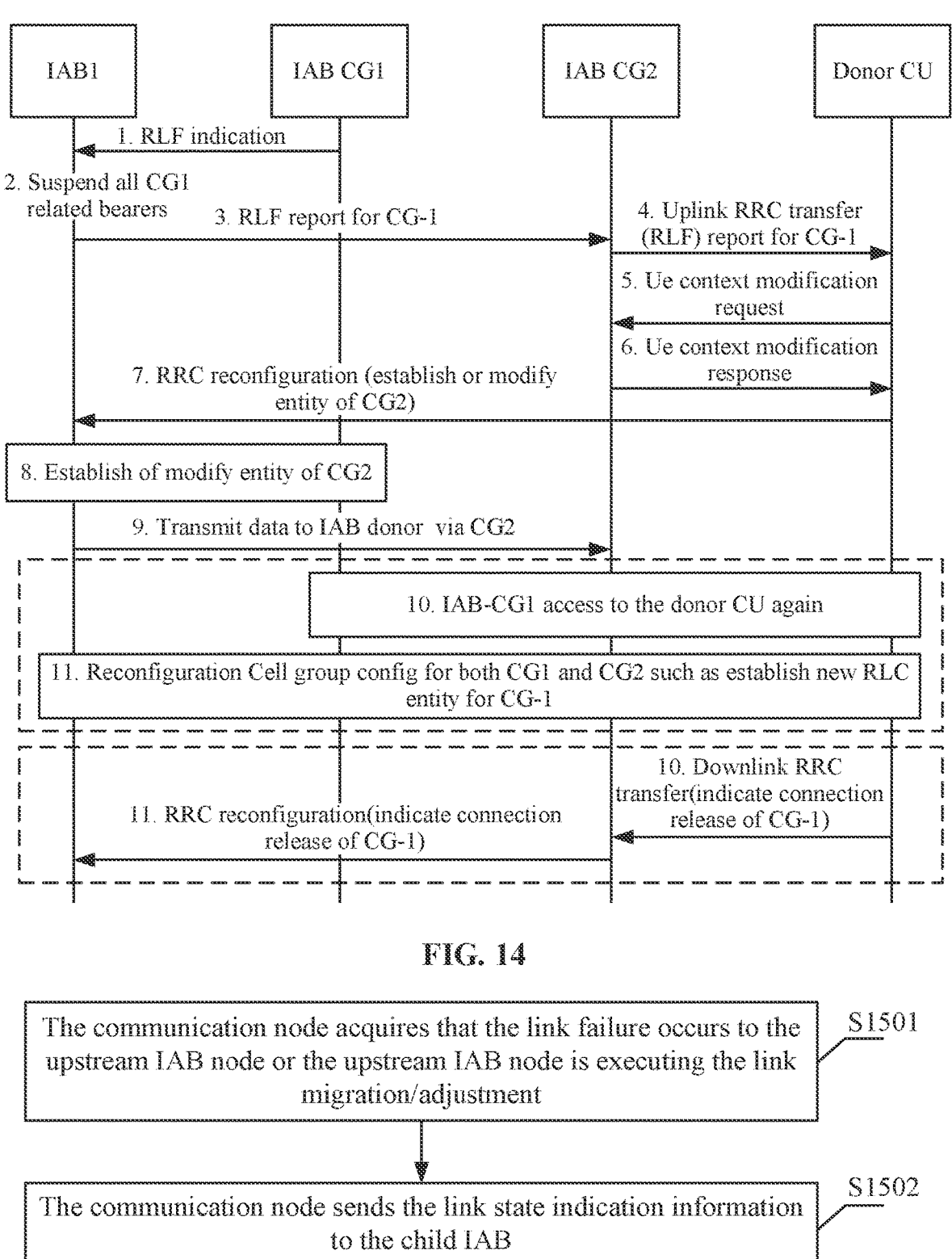
FIG. 14 is a schematic diagram of a handover flow of an IAB node according to embodiment eight of the present disclosure.
FIG. 15 is a flowchart of an IAB link control method according to embodiment nine of the present disclosure.

For ease of understanding, the embodiment of the present disclosure is described below in one specific example. If a child IAB acquires that an RLF occurs to one parent IAB of the child IAB, the child IAB only needs to suspend the related cell group (CG) bearer, and sends a measurement report of the RLF to a donor CU through another link. The donor CU determines whether to replace the CG, configures route update through another link, indicates whether to release an RLC entity of the CG to which the link failure occurs, and if necessary, establishes a new RLC channel (RLF channel) on another CG; and all data originally transmitted through an SCG can be transmitted through an MCG. Specifically, as shown in FIG. 14, it is assumed that an IAB1 has two parent IABs: IAB-CG1 and IAB-CG2, and the RLF occurs to the IAB-CG1.

In step 1, the IAB CG1 sends an RLF indication to a child IAB.

In step 2, after receiving the RLF indication, the IAB1 suspends all signaling radio bearer (SRB) and data radio bearer (DRB) related to the CG1.

In steps 3 and 4, after receiving the RLF indication information, the IAB1 forwards the link failure indication information to the donor CU through the CG2, specifically, sends the link failure indication information carried in a CG Failure Information message to the donor CU. The link failure indication information includes a link identifier (a link of the IAB-CG1), an identifier (CG1) of the parent IAB to which the link failure occurs, a link failure cause (that the RLF occurs to the parent IAB CG1 of the IAB1), and a link failure type (link failure of the parent IAB CG1 of the IAB1).

In steps 5 to 9, the donor CU updates the route configuration, reconfigures the cell group configuration for the IAB1 as required and sends the UE context modification request to the CG2, and the CG2 feeds back the UE context modification response to the donor CU and establishes or modifies the RLF entity of the CG2. The IAB1 transmit data to the donor CU through the CG2.

In steps 10 and 11, if IAB CG1 successfully performs the RRC connection reestablishment and accesses to the donor CU again, the donor CU can reconfigure the route, reconfigure CG1 for the IAB1, add a new RLC entity, and accordingly adjust the RLC channel of the CG2.

In steps 10 and 11, if the IAB CG1 is not connected to the donor CU, the donor CU can notify to release the connection between the IAB1 and the CG1. Alternatively, the IAB CG1 stops sending a downlink signal and disconnects directly.

Embodiment Nine

In the embodiment of the present disclosure, when a child IAB acquires that an RLF occurs to a parent IAB, it can inform a child IAB of the child IAB. As shown in FIG. 15, FIG. 15 shows an IAB link control method provided by the embodiment of the present disclosure.

In S1501, a communication node acquires that a link failure occurs to an upstream IAB node or an upstream IAB node is executing a link migration/adjustment.

In S1502, the communication node sends link state indication information to the child IAB.

It can be understood that an IAB node sends the link state indication information through control information of a control layer, or sends the link state indication information to a child node through an MAC CE. For example, there is IAB5-IAB3-IAB1-Donor DU1-Donor CU1, after acquiring that the RLF occurs to a parent IAB1, an IAB3 informs link failure information to an IAB5 and sends link failure information to the IAB5 node. The link failure information includes at least one of: a link identifier or a route identifier, an identifier of the IAB node to which the link failure or the link migration occurs, a link failure cause, or a link state type. For example, the link state indication information includes a link identifier of a specific failure link IAB5-IAB3-IAB1-Donor DU1-Donor CU1, the link state type is the link failure, and the link failure cause is that the RLF occurs to the parent IAB.

Embodiment Ten

The embodiment of the present disclosure provides an IAB link control method. As shown in FIG. 16, the IAB link control method includes steps described below.

In S1601, a communication node acquires that a link failure occurs to an upstream IAB node or an upstream IAB node is executing a link migration and sends an RRC reestablishment request.

In the embodiment of the present disclosure, the IAB can notify a child IAB to select a new parent IAB after detecting an xth out-of-service (OOS), that is, a new parent IAB is selected for the child IAB in advance, but the current IAB is not released. If an RLF does not occur subsequently, the original connection is remained. If the RLF occurs subsequently, the child IAB is switched to a link where the new parent IAB is located and sends the RRC reestablishment request to a donor CU. The RRC reestablishment request includes a reestablishment cause, and the reestablishment cause includes a link failure occurs to the upstream IAB node or the upstream IAB node is executing a link migration. For example, the donor CU is informed that the reestablishment cause is that the RLF occurs to the parent IAB, so that the donor CU can select the original parent IAB or the new parent IAB for the IAB according to the link reestablishment request information.

In S1602, an RRC reestablishment message is received.

The donor CU receives the RRC reestablishment request and sends the RRC reestablishment information to the IAB, and the IAB receives the RRC reestablishment information, where the RRC reestablishment message includes a cell identifier or a DU identifier (used for indicating the reestablished cell or the reestablished DU). That is, after the donor CU receives the reestablishment request, it seems that it is not appropriate to directly feed back the related RRC setup or RRCReestablishment. It is considered that indication information is added in the RRCReestablishment, such as indicating the DU identifier selected by the donor CU, which is used to distinguish whether the IAB at this time should be connected to the original parent IAB or the newly selected parent IAB DU during reestablishment. For example, when the connection of the original parent IAB has resumed, the donor CU sends the RRC reestablishment message to the IAB, the RRC reestablishment message includes an identifier of the original parent IAB DU, and then IAB continues to use the original link for communication. When the connection of the original parent IAB has not resumed, the IAB can be agreed to connect to the new parent IAB and send the RRC reestablishment message including an identifier of the new parent IAB DU. At this time, the IAB may release the connection with the original parent IAB and update the parent IAB DU, and may also continue to be connected to the parent IAB and connect to the new parent IAB. Of course, the child IAB needs to be able to connect to multiple parents at the same time.

In S1603, according to the reestablished cell or the reestablished DU, the IAB acquires whether the IAB should be connected to the original parent IAB or the newly selected parent IAB DU during reestablishment.

It can be understood that the reestablished cell may be the original parent IAB of the IAB or the parent IAB DU newly selected by the donor CU.

It is worth understanding that in the embodiment of the present disclosure, after the IAB acquires that the link failure occurs to the upstream node or the upstream node is executing the link migration, the IAB may continue to remain the connection with the parent IAB and start performing the RRC reestablishment. In this scenario, the IAB needs to be able to connect to multiple parents at the same time. The advantage is that if the connection of the original link is resumed, the original link can be used immediately without re-accessing, because the IAB MT or the UE executes the RRC reestablishment under the condition of remaining related connection, the donor CU makes judgment after receiving a reestablishment request sent by the IAB, if the connection of the original parent IAB has been not resumed, the donor CU agrees that the IAB connects to the new parent IAB and sends the RRCReestablishment (RRC Reestablishment) message. At this time, the IAB releases connection with the original parent IAB and updates the parent IAB DU.

If the connection of the original parent IAB has been resumed, the donor CU can send a link resumption indication to the original parent IAB through the RRC reestablishment message, and then the IAB continues to use the original link to communicate after receiving the RRC message reestablishment information. In some embodiments, the donor CU may also not need to wait for a reestablishment application, that is, does not need to receive the RRC request sent by the IAB. Once the connection of the original parent IAB is resumed, the donor CU can send the link resumption indication through the original parent IAB, and in this way, the IAB can terminate a connection reestablishment program.

Embodiment Eleven

Considering a fixed geographic location of an IAB, when a source parent IAB resumes work, the IAB may need to switch back again according to a result of a measurement report, which also increases the signaling overhead of a network. Therefore, it is considered that a parent IAB is not replaced for a child IAB, after the current parent IAB completes the handover and is enabled to have a DU function, the child IAB continues to connect to the original parent IAB through a handover flow.

In this manner, when the source donor CU determines to switch a certain IAB, according to routing information and a measurement report reported by an IAB MT, and determines a target donor DU and a target donor CU of all related downstream IAB nodes (including a switched IAB located in an MCG link or a downstream IAB with only one link) at the same time. According to the measurement report, it is assumed that donor CU thinks that the downstream IAB node is best to be connected to the original parent IAB, since the IAB node may stop connecting to a source CU after a handover indication is received, the source CU needs to send handover indication information in order from lower layer to upper layer. For example, if an IAB5 requires an inter-CU handover, and there is a route relationship of IAB7-IAB6-IAB5-IAB4-donor DU-donor CU. In steps 3 to 6 in FIG. 6, a CU1 and a CU2 need to interact with handover requests and handover acknowledgement information of all related IABs (an IAB7, an IAB6 and an IAB5). After the handover acknowledgement information is obtained, the source CU sends handover indication information to all related IABs, separately. Specifically, the source CU first sends migrating command indication information to the IAB7, then sends the migrating command indication information to the IAB6, finally sends the migrating command indication information to the IAB5, and then executes a handover flow. After receiving a handover indication, the migrating IAB (IAB5) executes a random access procedure to access the target CU, but before IAB5 completes the handover flow and is enabled to have a DU function, IAB6 cannot detect a signal of IAB5 and successfully access IAB5, so that a handover delay of the IAB6 will be relatively long, and the donor CU can configure a longer T304 timer for the IAB6.

It is to be noted that the donor CU needs to send the RRC reconfiguration message before the parent IAB handover is completed. For the child IAB, a DU function of a target parent IAB is not started to work at this time, and the RRC reconfiguration message is determined by both of the target donor CU and the target DU. Since the target DU is not changed, reconfiguration information determined by the DU may remain unchanged, and configuration information determined by the CU is sent through the RRC reconfiguration message. That is, since the migrating IAB does not complete the handover at this time, the child IAB that switches along with the migrating IAB may not fully know the configuration information of the migrating IAB which has switched at this time. Therefore, the handover indication information sent at this time may be different from handover information in a current protocol, and the donor CU can only configure the information content that can be completely determined by the donor CU, for example, configure uplink and downlink subframe/symbol configuration information.

For the information determined by the DU, the information directly indicates that the related downstream IAB needs to switch to the new donor CU together with the parent IAB. After receiving the information, the related downstream IAB can know that the handover needs to be performed, and the target CU changes but the target DU is still the original DU.

Therefore, based on the above content, the embodiment provides an IAB link control method. As shown in FIG. 17, the method includes the steps described below.

In S1701, an IAB MT receives a downlink RRC message.

In S1702, an IAB DU initializes an F1 establishment procedure.

If a migrating IAB still transmits an MIB and a synchronization signal during handover, the child IAB can continue to be connected to the migrating IAB. When the migrating IAB completes handover, and an F1 connection is established and a DU function starts working, the target CU sends new RRC configuration information through the RRC message, after the child IAB acquires that the parent migrating IAB handover is completed, the child IAB sends an RRC reconfiguration completion message to the target CU, then the DU of the child IAB establishes the F1 connection with the target CU, the DU function starts working, and so on. A child IAB of next layer continues to complete handover until all related downstream IAB finish handover. In this way, the downlink RRC message that the donor CU needs to send includes at least one of: indication information of the target DU, information indicating that the CU is updated, F1 interface reestablishment indication information, identifier information of the CU, IP information of the CU, configuration information of a service cell, bearer suspension indication information, or subframe configuration information. The subframe configuration information includes at least one of subframe configuration information, slot configuration information, symbol configuration information, subframe pattern configuration information, slot pattern configuration information, symbol pattern configuration information, TDD-UL-DL-ConfigDedicated, slotSpecific-Configuration, subframeConfigPatternFDD, subframeConfigPatternTDD, slotConfigPatternFDD, or slotConfigPatternTDD.

The subframe configuration information includes at least one of: a number of subframes used for downlink, a number of subframes available for downlink, a number of subframes available for downlink or uplink, a number of subframes used for uplink, a number of subframes available for uplink or a number of disabled (unusable) subframes.

The slot configuration information includes at least one of: a number of slots used for downlink, a number of slots available for downlink, a number of slots available for downlink or uplink, a number of slots used for uplink, a number of slots available for uplink or a number of disabled (unusable) slots.

The symbol configuration information includes at least one of: a number of symbols used for downlink, a number of symbols available for downlink, a number of symbols available for downlink or uplink, a number of symbols used for uplink, a number of symbols available for uplink or a number of disabled (unusable) symbols.

The subframe pattern configuration information includes at least one of a subframe pattern used for downlink, a subframe pattern available for downlink, a subframe pattern available for downlink or uplink, a subframe pattern used for uplink, a subframe pattern available for uplink or a disabled (unusable) subframe pattern.

The slot pattern configuration information includes at least one of a slot pattern used for downlink, a slot pattern available for downlink, a slot pattern available for downlink or uplink, a slot pattern used for uplink, a slot pattern available for uplink or a disabled (unusable) slot pattern.

The symbol pattern configuration information includes at least one of a symbol pattern used for downlink, a symbol pattern available for downlink, a symbol pattern available for downlink or uplink, a symbol pattern used for uplink, a symbol pattern available for uplink or a disabled (unusable) symbol pattern.

In the embodiment of the present disclosure, the above downlink RRC message may be carried in an RRC reconfiguration message or an RRC downlink configuration message associated with the IAB or an RRC reconfiguration message of a relay.

In some embodiments, based on the above content, an IAB link control method is further provided. As shown in FIG. 18, the method includes the steps described below.

In S1801, an IAB receives a downlink RRC message.

In S1802, the IAB initializes a random access procedure.

If the migrating IAB stops sending the downlink signal during the handover, the child IAB cannot detect the migrating IAB, continuously attempts to initiate a random access function according to the handover indication, and cannot re-access to the target CU until the migrating IAB resumes work. To avoid invalid random access attempts, an RRC reconfiguration message that the donor CU needs to send includes at least one of: a first timer timeout time for indicating that a random access flow is executed after timeout, a second timer timeout time for indicating that an RRC reestablishment flow is executed after timeout, a terminal identifier for indicating identifier information after a new CU is accessed, random access configuration information, indication information of a target DU, information indicating that the CU is updated, F1 interface reestablishment indication information, identifier information of the CU, IP information of the CU, configuration information of a service cell, subframe configuration information shared by cells, UE-specific subframe configuration information or IAB-specific subframe configuration information, SIB1, or a cell-specific uplink and downlink resource configuration and/or a UE-specific uplink and downlink resource configuration. The subframe configuration information includes at least one of subframe configuration information, slot configuration information, symbol configuration information, subframe pattern configuration information, slot pattern configuration information, symbol pattern configuration information, TDD-UL-DL-ConfigDedicated, slotSpecific-Configuration, subframeConfigPatternFDD, subframeConfigPatternTDD, slotConfigPatternFDD, or slotConfigPatternTDD.

The subframe configuration information includes at least one of: the number of subframes used for downlink, the number of subframes available for downlink, the number of subframes available for downlink or uplink, the number of subframes used for uplink, the number of subframes available for uplink or the number of disabled (unusable) subframes.

The slot configuration information includes at least one of: the number of slots used for downlink, the number of slots available for downlink, the number of slots available for downlink or uplink, the number of slots used for uplink, the number of slots available for uplink or the number of disabled (unusable) slots.

The symbol configuration information includes at least one of: the number of symbols used for downlink, the number of symbols available for downlink, the number of symbols available for downlink or uplink, the number of symbols used for uplink, the number of symbols available for uplink or the number of disabled (unusable) symbols.

The subframe pattern configuration information includes at least one of the subframe pattern used for downlink, the subframe pattern available for downlink, the subframe pattern available for downlink or uplink, the subframe pattern used for uplink, the subframe pattern available for uplink or the disabled (unusable) subframe pattern.

The slot pattern configuration information includes at least one of the slot pattern used for downlink, the slot pattern available for downlink, the slot pattern available for downlink or uplink, the slot pattern used for uplink, the slot pattern available for uplink or the disabled (unusable) slot pattern.

The symbol pattern configuration information includes at least one of the symbol pattern used for downlink, the symbol pattern available for downlink, the symbol pattern available for downlink or uplink, the symbol pattern used for uplink, the symbol pattern available for uplink or the disabled (unusable) symbol pattern.

In the embodiment of the present disclosure, the downlink RRC message is carried in the RRC reconfiguration message or the RRC configuration message of the IAB or the RRC reconfiguration message of the relay.

Figures 19, 20:
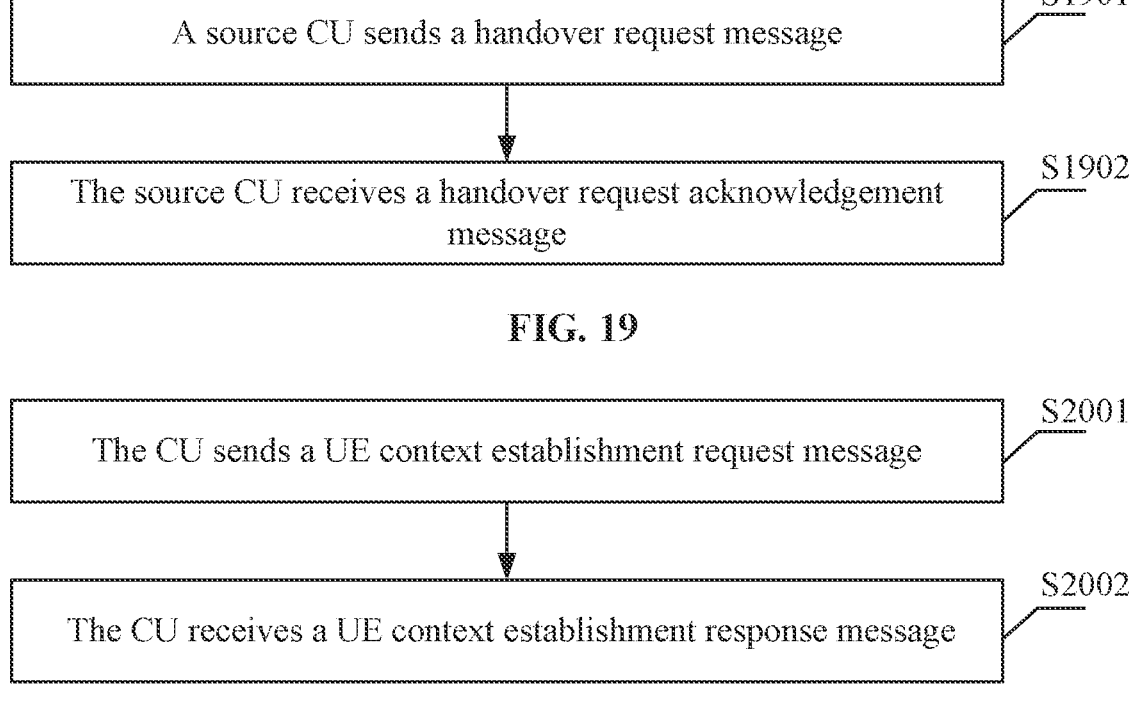
FIG. 19 is a flowchart 3 of an IAB link control method according to embodiment eleven of the present disclosure.
FIG. 20 is a flowchart of an IAB link control method according to embodiment twelve of the present disclosure.

It is worth noting that based on the above content, the embodiment provides an IAB link control method. As shown in FIG. 19, the method includes the steps described below.

In S1901, a source CU sends a handover request message.

In S1902, the source CU receives a handover request acknowledgement message.

For the MT part of the child IAB, the DU of the handover target cell is the original DU, and when the source CU sends the handover request to the target CU, the handover target DU does not establish a connection with the handover target CU. Therefore, the handover request message from the source CU to the target CU needs to carry context information of all the IABs to be switched, context information of the UE, and a topological relationship between each IAB and the UE or routing information of all UEs, and the handover request acknowledgement message sent by the target CU to the source CU at least carries PDU session resources admitted list information.

It is worth noting that the handover request message includes at least one of: context information of one or more IABs to be switched and context information of the UE, topological information between multiple IABs and the UE, routing information of one or more UEs, multi-communication node handover indication information, group handover indication information, handover communication node identifier information, type information of a handover communication node, configuration information related to the UE and retained on a CU side. The context information includes at least one of routing information, Signalling TNL association address at source NG-C side, PDU Session Resources To Be Setup List or UE type information (a type in the UE type information includes the IAB and the UE). A type of the handover communication node includes the IAB and the UE.

Embodiment Twelve

An embodiment of the present disclosure provides an IAB link control method. As shown in FIG. 20, the method includes steps described below.

In S2001, a CU sends a UE context establishment request message.

In S2002, the CU receives a UE context establishment response message.

Figure 21:
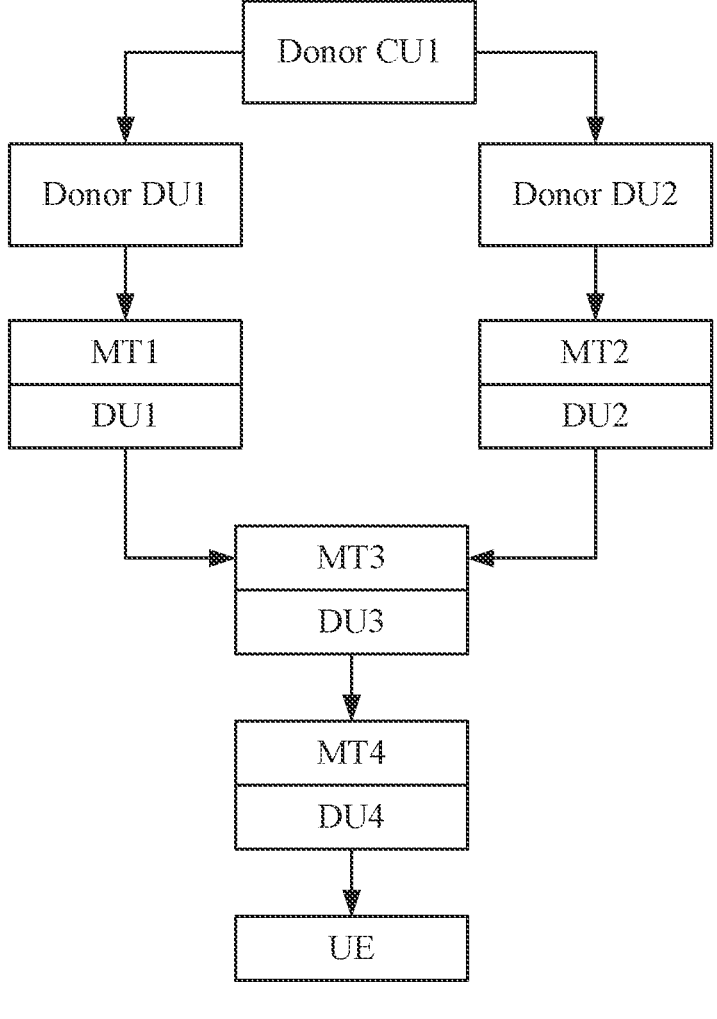
FIG. 21 is a schematic diagram of an IAB link according to embodiment twelve of the present disclosure.

As shown in FIG. 21, Assuming that two parent DUs connected to an IAB belong to a same donor CU, in this scenario, an S-NODE and an M-NODE are the same donor CU, so that an addition flow of the S-NODE does not need to be interacted via an Xn interface. A GNB CU sends a UE context setup request message to a GNB DU to establish a UE context to trigger addition of an SCG, and it is necessary to consider whether an SCG DU node needs to know whether an ordinary UE requests access or an IAB requests access. Specifically, the UE context establishment request message includes UE type information, which includes a UE type, an IAB type and a relay type. For example, a donor CU1 sends the UE context establishment request message to a donor DU1, the donor DU1 acquires from the UE context establishment request message that the ordinary UE requests access, and the donor DU1 receives the UE context establishment request message and sends the UE context establishment response message to the donor CU1.

Embodiment Thirteen

Figure 22:
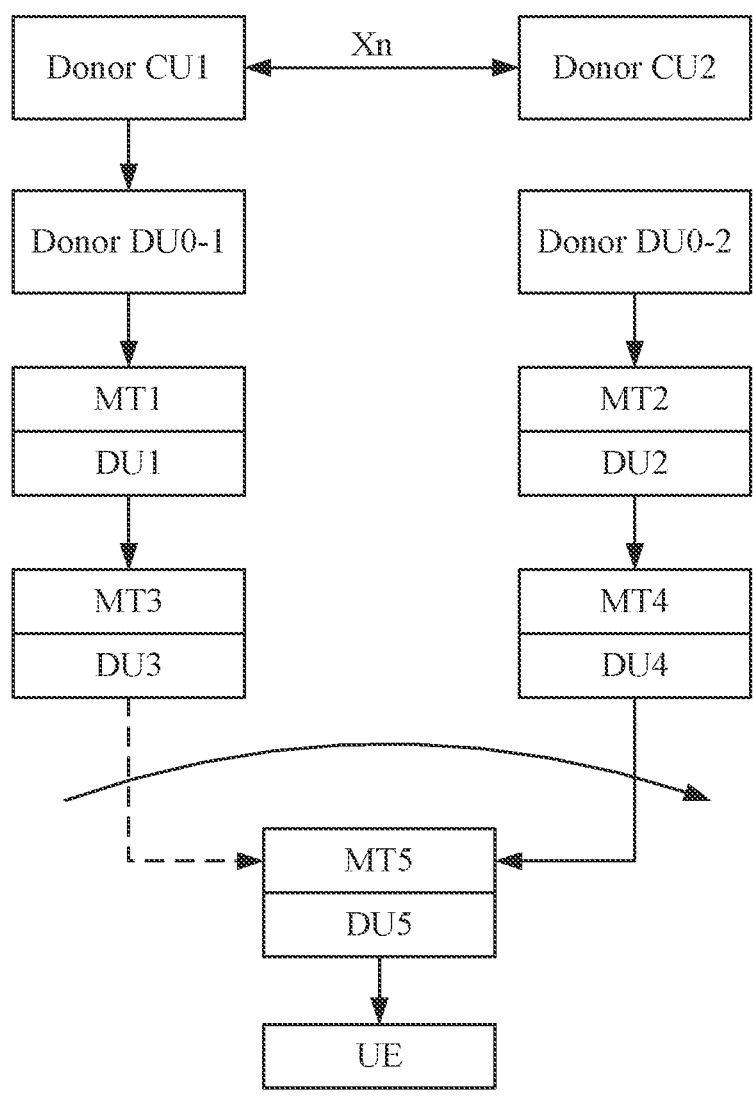
FIG. 22 is a schematic diagram of an IAB link according to embodiment thirteen of the present disclosure.

As shown in FIG. 22, assuming that there is a routing relationship, such as IAB6-IAB5-IAB3-IAB1-Donor DU1-Donor CU1, where an IAB5 as the migrating IAB node reselects a parent IAB, after a handover is completed, a route of the IAB5 becomes IAB5-IAB4-Donor DU2-Donor CU2. For the IAB5, after an indication of switching to a new donor CU is received, the IAB5 stops serving a child IAB and a UE. An IAB6 is a child IAB of the IAB5, when the IAB5 stop serving, the IAB6 may detect that an RLF occurs, and if the RLF occurs, the child IAB may need to select a new parent IAB by performing an RRC reestablishment flow. Compared with handover, delay expended by an RRC reestablishment may be much more, and for some strict latency traffic, the delay requirement may not be satisfied. In the embodiment of the present disclosure, considering that the handover behavior can be perceived and controlled by a donor CU side, therefore, when the donor CU determines to perform an inter-CU handover on the IAB, the donor CU needs to determine how to switch all related downstream IAB nodes of the IAB at the same time, and sends handover indication information in order from bottom to top. Specifically, as shown in FIG. 22, after a source donor CU determines to switch the IAB5, the donor CU can determine a target donor DU and a target donor CU for the IAB5 according to a measurement report reported by each IAB MT and topology routing information, and determine an operation of all downstream IAB nodes of the IAB5 at the same time. Different condition of the child IAB (IAB6) of the IAB5 node can be divided into the following types.

1. The child IAB has a redundant route. Specifically, the IAB5 where the handover occurs is located on a link of an MCG, and the IAB5 where the handover occurs is located on a link of an SCG.

2. The child IAB does not have a redundant route.

For the link of the MCG where the IAB5 that the handover occurs is located and the child IAB with no redundant route, because the child IAB has no other link to work, the donor CU may determine to let the IAB5 switch according to the measurement report, and determine the target donor DU and the target donor CU for the IAB5. The measurement report includes that for the child IAB of the link of the SCG where the IAB5 that the handover occurs is located, the donor CU may release the link of the SCG directly reconfigure the related routing information, release the related F1 connection, and determine which SCG to add sequentially.

Since the IAB5 node may stop the connection with the source donor CU after receiving the handover indication, the source donor CU needs to send the handover indication information in order from the lower layer to the upper layer. Taking the above drawing as an example, if the IAB5 needs to perform inter-CU handover, because the IAB6 is a child IAB of the IAB5, the donor CU needs to send migrating command indication information to the IAB6 first, and finally send the migrating command indication information to the IAB5. Then, after multiple IAB nodes (IAB6, IAB5) receive the above indication, the following operations are completed according to the normal handover flow. Compared with the RRC reestablishment, this way reselects the new parent IAB through handover, and the delay is relatively smaller.

Embodiment Fourteen

In an embodiment of the present disclosure, after a link handover or a link migration is executed, an IAB is connected to a new donor CU. In the procedure of the link handover or the link migration, a child node of the IAB still remains connection with the IAB, so that when the IAB is successfully switched, the child node of the IAB also needs to establish connection with a new donor CU. The following two implementation solutions are considered.

Solution 1:

When the source CU of the IAB determines to switch the IAB to another target CU, the source CU first sends an F1 release request to the child IAB of the IAB.

After the IAB successfully switches to the new target donor CU, the child node of the IAB initializes the F1 establishment procedure and sends the F1 connection establishment request to the target donor CU.

The F1 message may include an identifier of a target CU or an IP address of a target CU.

Solution 2:

After the IAB successfully switches to the new target donor CU, the donor CU receives the context information of the IAB and all the child nodes of the IAB from the source donor CU, first establishes an F1 connection with the DU of the IAB, and then establishes the F1 connection with the child nodes of the IAB in turn. Since the child node of the IAB does not know when the IAB completes the handover, the child node of the IAB needs to be notified by the donor CU. The specific procedure includes the following.

A CU sends an F1 message to the child node of the IAB, and the F1 message includes an F1 reestablishment message or an F1 reestablishment request message or an F1 establishment request message.

After the above message is received, the child node of the IAB initializes an F1 establishment procedure and sends an F1 connection establishment request to the donor CU.

The F1 message may include an identifier of a target CU or an IP address of a target CU.

Embodiment Fifteen

Figure 23:
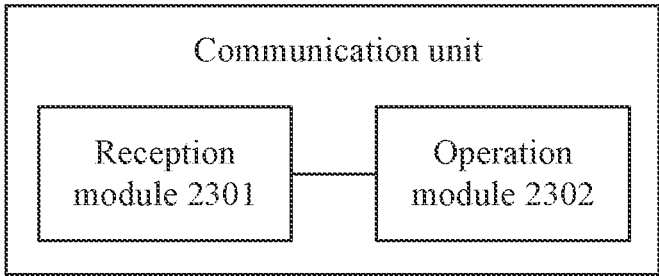
FIG. 23 is a schematic diagram 1 of a communication unit according to embodiment fifteen of the present disclosure.

An embodiment of the present disclosure provides a communication unit. As shown in FIG. 23, the communication unit includes a reception module 2301 and an operation module 2302.

The reception module 2301 is configured to receive control information sent by a CU.

The operation module 2302 is configured to execute an operation corresponding to the control information according to the control information.

In the embodiment of the present disclosure, the control information includes routing information, and the routing information is sent to the communication unit through an RRC connection reconfiguration message or an F1 UE context adjustment message.

The routing information includes at least one piece of routing list information, and the at least one piece of routing list information includes at least one of the following: a target node identifier and a next hop node identifier, cost information, routing configuration information or routing state information. The routing state information is used for indicating a routing state, and the routing state includes at least one of deactivation, activation, unavailability, availability, switching or link failure.

The step in which the operation corresponding to the control information is executed according to the control information includes that the operation module 2302 updates a route according to the routing information.

In the embodiment of the present disclosure, the routing configuration information includes at least one of route priority information, a default route identifier/index or a highest priority route identifier/index; or the routing configuration information includes a first or last route of the at least one piece of routing list information to be a default route or a highest priority route; or the routing configuration information includes the at least one piece of routing list information in order from high to low or from low to high.

In the embodiment of the present disclosure, when the routing information includes the routing configuration information, the communication unit further includes a transmission module, and after the operation module 2302 updates the route according to the routing information. after the reception module 2301 receives a radio resource control (RRC) connection establishment request message, the transmission module transmits the RRC connection establishment request message through the default route or the highest priority route.

In the embodiment of the present disclosure, the control information includes a downlink RRC message, and the downlink RRC message includes at least one of information indicating that the CU is updated, F1 interface reestablishment indication information, identifier information of the CU or IP information of the CU, bearer suspension indication information or subframe configuration information. The subframe configuration information includes at least one of subframe configuration information, slot configuration information, symbol configuration information, subframe pattern configuration information, slot pattern configuration information, symbol pattern configuration information, TDD-UL-DL, TDD-UL-DL-ConfigDedicated, slotSpecificConfiguration, subframeConfigPatternFDD, subframeConfigPatternTDD, slotConfigPatternFDD, or slotConfigPatternTDD.

Further, the subframe configuration information includes at least one of: a number of subframes used for downlink, a number of subframes available for downlink, a number of subframes available for downlink or uplink, a number of subframes used for uplink, a number of subframes available for uplink or a number of disabled (unusable) subframes.

The slot configuration information includes at least one of: a number of slots used for downlink, a number of slots available for downlink, a number of slots available for downlink or uplink, a number of slots used for uplink, a number of slots available for uplink or a number of disabled (unusable) slots.

The symbol configuration information includes at least one of: a number of symbols used for downlink, a number of symbols available for downlink, a number of symbols available for downlink or uplink, a number of symbols used for uplink, a number of symbols available for uplink or a number of disabled (unusable) symbols.

The subframe pattern configuration information includes at least one of a subframe pattern used for downlink, a subframe pattern available for downlink, a subframe pattern available for downlink or uplink, a subframe pattern used for uplink, a subframe pattern available for uplink or a disabled (unusable) subframe pattern.

The slot pattern configuration information includes at least one of a slot pattern used for downlink, a slot pattern available for downlink, a slot pattern available for downlink or uplink, a slot pattern used for uplink, a slot pattern available for uplink or a disabled (unusable) slot pattern.

The symbol pattern configuration information includes at least one of a symbol pattern used for downlink, a symbol pattern available for downlink, a symbol pattern available for downlink or uplink, a symbol pattern used for uplink, a symbol pattern available for uplink or a disabled (unusable) symbol pattern.

For example, the specific information unit is as follows.

```
TDD-UL-DL-Pattern ::=                          SEQUENCE {
    dl-UL-TransmissionPeriodicity              ENUMERATED {ms0p5, ms0p625, ms1,
ms1p25, ms2, ms2p5, ms5, ms10},
    nrofDownlinkSlots                              INTEGER (0..maxNrofSlots),
    nrofDownlinkSymbols                              INTEGER (0..maxNrofSymbols-1),
    nrofUplinkSlots                            INTEGER (0..maxNrofSlots),
    nrofUplinkSymbols                              INTEGER (0..maxNrofSymbols-1),
    ...,
}
TDD-UL-DL-ConfigDedicated ::=                  SEQUENCE {
    slotSpecificConfigurationsToAddModList              SEQUENCE (SIZE
(1..maxNrofSlots)) OF TDD-UL-DL-SlotConfig              OPTIONAL, --
Need N
    slotSpecificConfigurationsToreleaseList            SEQUENCE (SIZE (1..maxNrofSlots))
OF TDD-UL-DL-SlotIndex                         OPTIONAL,-- Need N
    ...
}
TDD-UL-DL-SlotConfig ::=                       SEQUENCE {
    slotIndex                                      TDD-UL-DL-SlotIndex,
    symbols                                        CHOICE {
        allDownlink                                    NULL,
        allUplink                                      NULL,
        explicit                                       SEQUENCE {
            nrofDownlinkSymbols                            INTEGER (1..maxNrofSymbols-
1)                                                         OPTIONAL, -- Need S
            nrofUplinkSymbols                              INTEGER (1..maxNrofSymbols-
1)                                                         OPTIONAL -- Need S
        }
    }
}
TDD-UL-DL-SlotIndex ::=                        INTEGER (0..maxNrofSlots-1)
```

TDD-UL-DL-Pattern field descriptions dl-UL-TransmissionPeriodicity
Periodicity of the DL-UL pattern,
nrofDownlinkSlots
Number of consecutive full DL slots at the beginning of each DL-UL pattern
nrofDownlinkSymbols
Number of consecutive DL symbols in the beginning of the slot following the last full DL slot (as derived from nrofDownlinkSlots).
nrofUplinkSlots
Number of consecutive full UL slots at the end of each DL-UL pattern,
nrofUplinkSymbols
Number of consecutive UL symbols in the end of the slot preceding the first full UL slot (as derived from nrofUplinkSlots).
TDD-UL-DL-ConfigDedicated field descriptions
slotSpecificConfigurationsToAddModList
The slotSpecificConfiguration allows overriding UL/DL allocations provided in tdd-UL-DL-configurationCommon, TDD-UL-DL-SlotConfig field descriptions nrofDownlinkSymbols
Number of consecutive DL symbols in the beginning of the slot identified by slotIndex. If the field
is absent the UE assumes that there are no leading DL symbols.
nrofUplinkSymbols
Number of consecutive UL symbols in the end of the slot identified by slotIndex. If the field is
absent the UE assumes that there are no trailing UL symbols
slotIndex
Identifies a slot within a dl-UL-TransmissionPeriodicity (given in tdd-UL-DL-
configurationCommon)
symbols
The direction (downlink or uplink) for the symbols in this slot. "allDownlink" indicates that all
symbols in this slot are used for downlink; "allUplink" indicates that all symbols in this slot are
used for uplink; "explicit" indicates explicitly how many symbols in the beginning and end of this
slot are allocated to downlink and uplink, respectively.

The step in which the operation corresponding to the control information is executed according to the control information includes that the operation module 2302 initializes an F1 establishment procedure.

The downlink RRC message is carried in an RRC reconfiguration message or an RRC downlink configuration message associated with an IAB or an RRC reconfiguration message of a relay.

The control information includes a downlink RRC message, and the downlink RRC message includes at least one of identifier information of the DU, identifier information of the CU, information indicating that the CU is updated, configuration information of a service cell, a first timer timeout time for indicating that a random access flow is executed after timeout, a second timer timeout time for indicating that an RRC reestablishment flow is executed after timeout, a terminal identifier for indicating identifier information after a new CU is accessed, random access configuration information, subframe configuration information shared by cells, UE-specific subframe configuration information or IAB-specific subframe configuration information, SIB1, or a cell-specific uplink and downlink resource configuration and/or a UE-specific uplink and downlink resource configuration.

The subframe configuration information includes at least one of subframe configuration information, slot configuration information, symbol configuration information, subframe pattern configuration information, slot pattern configuration information, symbol pattern configuration information, TDD-UL-DL-ConfigDedicated, slotSpecificConfigurations, subframeConfigPatternFDD, subframeConfigPatternTDD, slotConfigPatternFDD, or slotConfigPatternTDD.

The subframe configuration information includes at least one of: the number of subframes used for downlink, the number of subframes available for downlink, the number of subframes available for downlink or uplink, the number of subframes used for uplink, the number of subframes available for uplink or the number of disabled (unusable) subframes.

The slot configuration information includes at least one of: the number of slots used for downlink, the number of slots available for downlink, the number of slots available for downlink or uplink, the number of slots used for uplink, the number of slots available for uplink or the number of disabled (unusable) slots.

The symbol configuration information includes at least one of: the number of symbols used for downlink, the number of symbols available for downlink, the number of symbols available for downlink or uplink, the number of symbols used for uplink, the number of symbols available for uplink or the number of disabled (unusable) symbols.

The subframe pattern configuration information includes at least one of the subframe pattern used for downlink, the subframe pattern available for downlink, the subframe pattern available for downlink or uplink, the subframe pattern used for uplink, the subframe pattern available for uplink or the disabled (unusable) subframe pattern.

The slot pattern configuration information includes at least one of the slot pattern used for downlink, the slot pattern available for downlink, the slot pattern available for downlink or uplink, the slot pattern used for uplink, the slot pattern available for uplink or the disabled (unusable) slot pattern.

The symbol pattern configuration information includes at least one of the symbol pattern used for downlink, the symbol pattern available for downlink, the symbol pattern available for downlink or uplink, the symbol pattern used for uplink, the symbol pattern available for uplink or the disabled (unusable) symbol pattern.

The step in which the operation corresponding to the control information is executed according to the control information includes that the operation module 2302 initializes a random access procedure.

The downlink RRC message is carried in the RRC reconfiguration message, or the RRC downlink configuration message associated with the IAB, or the RRC reconfiguration message of the relay.

In the embodiment of the present disclosure, the control information includes an F1 message, and the F1 message includes at least one of releasing a message connected to F1, an F1 reestablishment message or an F1 reestablishment request message or an F1 establishment request message.

The step in which the operation corresponding to the control information is executed according to the control information includes that the operation module 2302 initializes an F1 establishment procedure or sends an F1 connection establishment request.

The F1 message further includes an identifier of a target CU or an IP address of a target CU.

In the embodiment of the present disclosure, the control information includes a downlink RRC message, the downlink RRC message includes condition handover configuration information, and the condition handover configuration information includes at least one of target cell configuration information at least including a target cell identifier, a new terminal identifier (RNTI-Value), random access configuration information, handover condition configuration information, or random access condition configuration information. The handover condition configuration information or the random access condition configuration information includes event information triggering a condition handover. Executing the operation corresponding to the control information according to the control information includes that when an event triggering the condition handover is satisfied, the communication unit initializes a random access procedure.

The event information triggering the condition handover includes at least one of radio link failure (RLF) occurring to a link, in a case where a T310 timer of a primary service cell (PCell) times out, receiving a random access issue indication of an MAC, an RLC protocol indicating that a maximum number of retransmissions is reached, an RLF occurring to a Parent IAB of the communication unit, an RLF occurring to an upstream IAB node of the communication unit, an RRC release occurring to a current link, or a data inactivity timer timing out.

Figure 24:
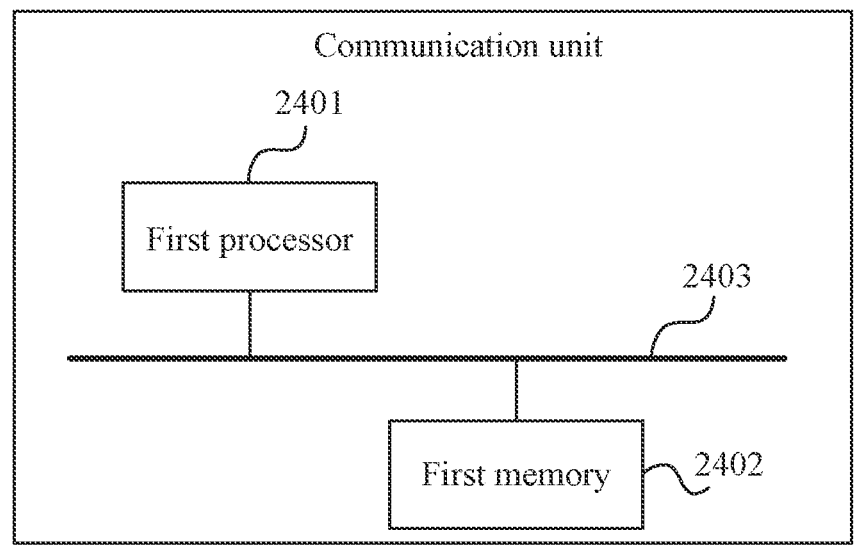
FIG. 24 is a schematic diagram 2 of a communication unit according to embodiment fifteen of the present disclosure.

An embodiment of the present disclosure provides a communication unit. As shown in FIG. 24, the communication unit includes a first processor 2401, a first memory 2402 and a first communication bus 2403.

The first communication bus 2403 is configured to enable connection and communication between the first processor 2401 and the first memory 2402.

The processor 2401 is configured to execute one or more computer programs stored in the first memory 2402 to implement at least one step of the IAB link control method in embodiment one.

Figure 25:
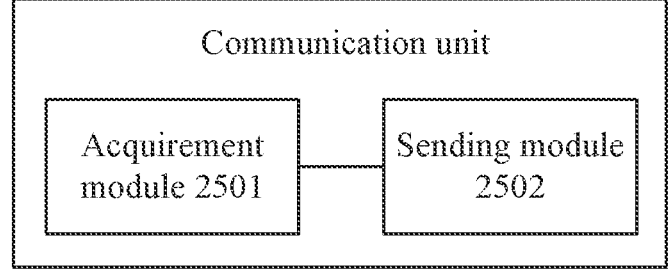
FIG. 25 is a schematic diagram 3 of a communication unit according to embodiment fifteen of the present disclosure.

An embodiment of the present disclosure provides another communication unit. As shown in FIG. 25, the communication unit includes an acquirement module 2501 and a sending module 2502.

The acquirement module 2501 is configured to acquire that a link failure occurs to an upstream IAB of the IAB or an upstream IAB of the IAB is executing a link migration/adjustment.

The sending module 2502 is configured to send link state indication information to a donor CU or a child IAB.

The link state indication information includes at least one of: a link identifier or a route identifier, an identifier of an IAB to which the link failure or the link migration occurs, a link failure cause or a link state type. The link failure cause includes a parent IAB link failure, a master cell group (MCG) link failure and a secondary cell group (SCG) link failure, and the link state type includes the link failure and the link migration.

The link state indication information is sent through an IAB link state message or a CG Failure Information message or an RRC uplink message or an uplink MAC CE or control layer control information.

The step in which the IAB sends the link state indication information to the donor CU includes that after the IAB acquires a message indicating that the link failure occurs to one parent IAB or one parent IAB is executing the link migration/adjustment, the link state indication information is sent to the donor CU through another parent IAB.

Figure 26:
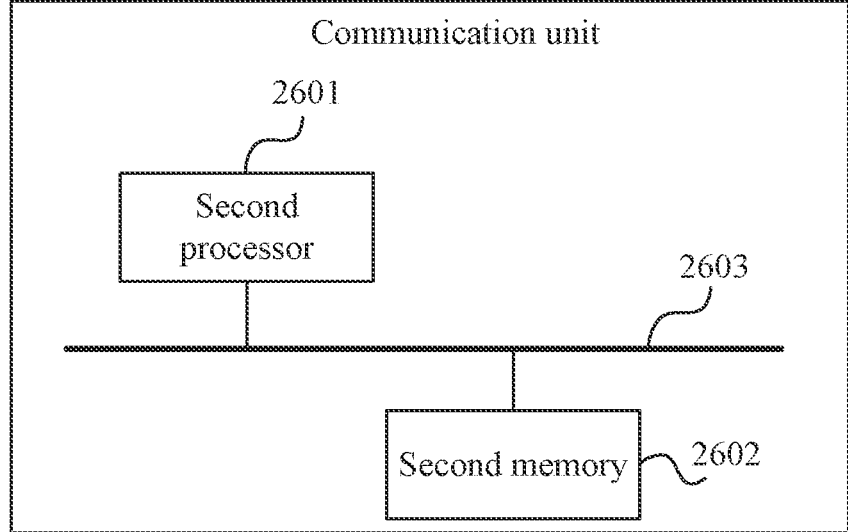
FIG. 26 is a schematic diagram 4 of a communication unit according to embodiment fifteen of the present disclosure.

An embodiment of the present disclosure provides a communication unit. As shown in FIG. 26, the communication unit includes a second processor 2601, a second memory 2602 and a second communication bus 2603.

The second communication bus 2603 is configured to implement connection and communication between the second processor 2601 and the second memory 2602.

The second processor 2601 is configured to execute one or more computer programs stored in the second memory 2602 to implement at least one step of the IAB link control method in embodiment two.

Figure 27:
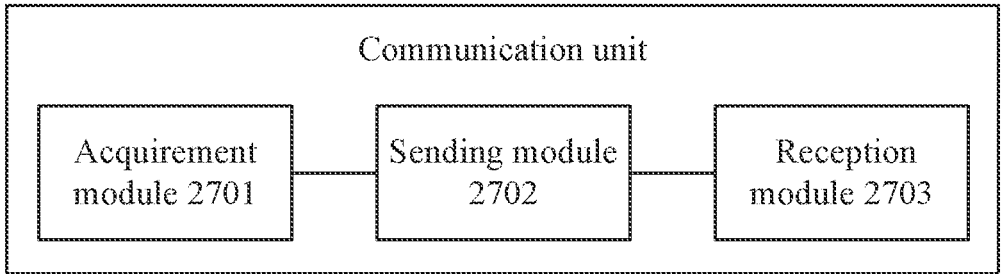
FIG. 27 is a schematic diagram 5 of a communication unit according to embodiment fifteen of the present disclosure.
Figure 28:
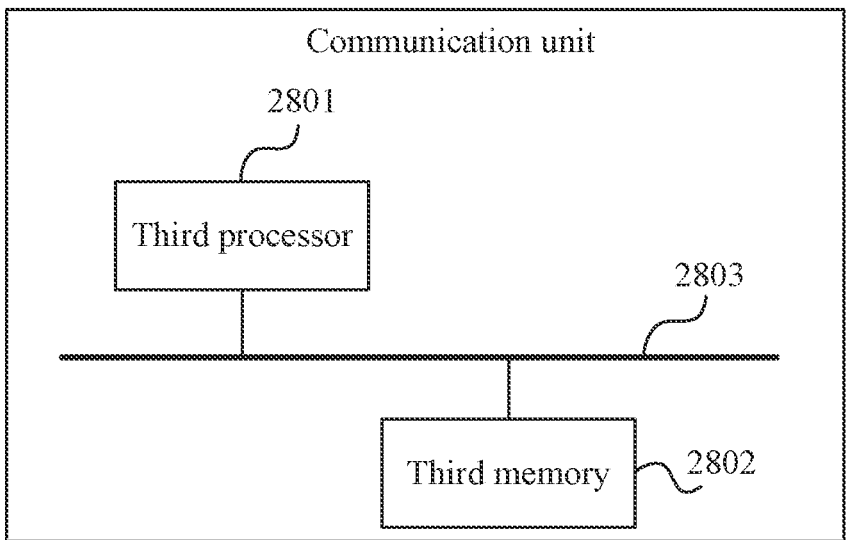
FIG. 28 is a schematic diagram 6 of a communication unit according to embodiment fifteen of the present disclosure.

An embodiment of the present disclosure further provides a communication unit. As shown in FIG. 27, the communication unit includes an acquirement module 2701, a sending module 2702 and a reception module 2703.

The acquirement module 2701 is configured to acquire that a link failure occurs to an upstream IAB of the IAB or an upstream IAB of the IAB is executing a link migration.

The sending module 2702 is configured to send link state indication information to a donor CU or a child IAB.

The reception module 2703 is configured to receive an RRC reestablishment message.

The RRC reestablishment request includes a reestablishment cause, and the reestablishment cause includes that the link failure occurs to the upstream IAB or the upstream IAB is executing the link migration/adjustment. The RRC reestablishment message includes an identifier of a cell used for reestablishment or an identifier of a DU used for reestablishment. The communication unit further includes a determination module, and the determination module is configured to determine, after receiving the RRC reestablishment message, a target IAB node to be connected according to the reestablished-cell identifier or the reestablished-DU identifier, and the target IAB node includes an original parent IAB or a newly selected parent IAB DU during reestablishment.

Figure 30:
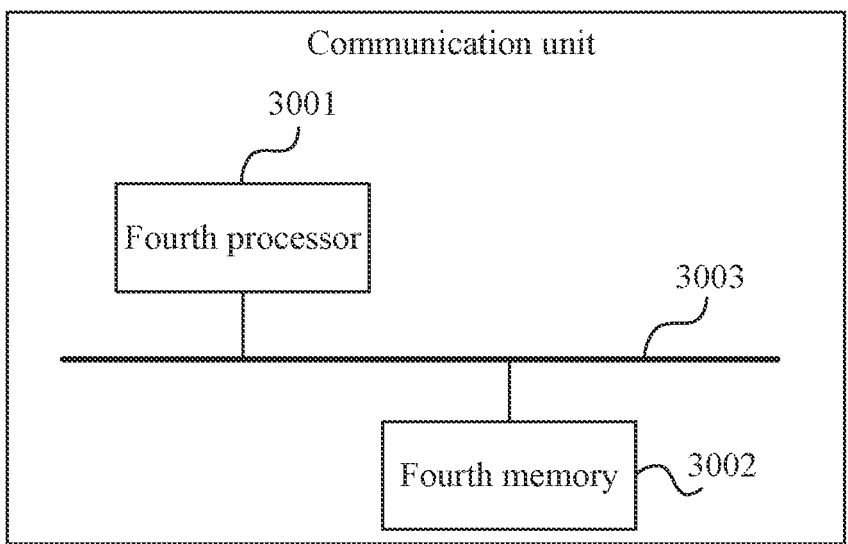
FIG. 30 is a schematic diagram 8 of a communication unit according to embodiment fifteen of the present disclosure.

An embodiment of the present disclosure further provides a communication unit. As shown in FIG. 30, the communication unit includes a third processor 3001, a third memory 3002 and a third communication bus 3003.

The third communication bus 3003 is configured to implement connection and communication between the third processor 3001 and the third memory 3002.

The third processor 3001 is configured to execute one or more computer programs stored in the third memory 3002 to implement at least one step of the IAB link control method in embodiment three.

Figure 29:
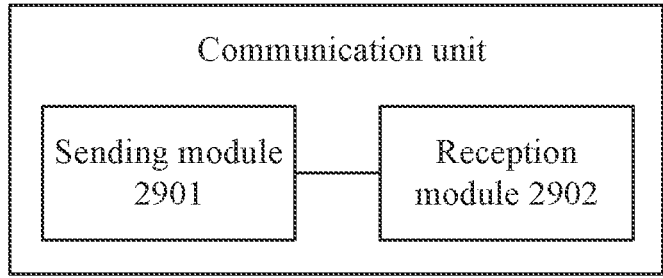
FIG. 29 is a schematic diagram 7 of a communication unit according to embodiment fifteen of the present disclosure.

An embodiment of the present disclosure further provides a communication unit. As shown in FIG. 29, the communication unit includes a sending module 2901 and a reception module 2902.

The sending module 2901 is configured to send IAB link control information.

The reception module 2902 is configured to receive feedback information corresponding to the IAB link control information.

In the embodiment of the present disclosure, the IAB link control information includes a handover request message, and the feedback information includes a handover request acknowledge message. The handover request message includes at least one of context information of at least one IAB to be switched and context information of a UE, topological information between multiple IABs and a UE, routing information of at least one UE, multi-communication node handover indication information, group handover indication information, handover communication node identifier information, type information of a handover communication node or configuration information related to the UE and retained by a CU side, where a type of the handover communication node includes the IAB and the UE.

The context information includes at least one of routing information of the UE or routing information of the IAB, Signalling TNL association address at source NG-C side, PDU Session Resources To Be Setup List, or UE type information, where a type in the UE type information includes the IAB and the UE.

In the embodiment of the present disclosure, the IAB link control information includes a UE context establishment request message, the feedback information includes a UE context establishment response message, and the UE context establishment request message includes the UE type information. The UE type information includes a UE type, an IAB type and a relay type.

An embodiment of the present disclosure further provides a communication unit. As shown in FIG. 30, the communication unit includes a third processor 3001, a third memory 3002 and a third communication bus 3003.

The third communication bus 3003 is configured to implement connection and communication between the third processor 3001 and the third memory 3002.

The third processor 3001 is configured to execute one or more computer programs stored in the third memory 3002 to implement at least one step of the IAB link control method in embodiment four.

This embodiment further provides a computer-readable storage medium. The computer-readable storage medium includes volatile or nonvolatile and removable or non-removable media implemented in any method or technology for the storage of information (such as computer-readable instructions, data structures, computer program modules or other data). The computer-readable storage medium includes, but is not limited to, a random-access memory (RAM), a read-only memory (ROM), an electrically erasable programmable read-only memory (EEPROM), a flash memory, or other memory technologies, a compact disc read-only memory (CD-ROM), a digital versatile disc (DVD) or another optical disc storage, a magnetic cassette, a magnetic tape, disk storage or another magnetic storage apparatus, or any other medium that may be used for storing desired information and accessed by a computer.

The computer-readable storage medium in this embodiment may be configured to store one or more computer programs executable by a processor to implement at least one step of the IAB link control method in the embodiments described above.

This embodiment provides a computer program product. The computer program product includes a computer-readable apparatus that stores the preceding computer program. In this embodiment, the computer-readable apparatus may include the preceding computer-readable storage medium.

It can be seen that it is to be understood by those skilled in the art that some or all steps of the preceding method and function modules/units in the preceding system or apparatus may be implemented as software (which may be implemented by computer program codes executable by a computing apparatus), firmware, hardware, and suitable combinations thereof. In the hardware implementation, the division of the preceding functional modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present application is not limited to any particular combination of hardware and software.

The above is a more detailed description of embodiments of the present disclosure in conjunction with implementations and is not to be construed as limiting embodiments of the present application. For those having ordinary skill in the art to which the present application pertains, simple deductions or substitutions may be made without departing from the concept of the present application and are considered to fall within the scope of the present application.

What is claimed is:

1. An integrated access backhaul (IAB) link control method, comprising:
   acquiring, by an IAB node, that a link failure occurs to an upstream IAB node of the IAB node or an upstream IAB node of the IAB node is executing a link migration/adjustment; and
   sending, by the IAB node, link state indication information to a donor CU or a child IAB node;
   wherein the link failure occurs to the upstream IAB node of the IAB node refers to a link failure between the upstream IAB node of the IAB node and a parent IAB node of the upstream IAB node;
   wherein the link state indication information comprises a link failure cause comprising a parent IAB link failure occurring between the upstream IAB node of the IAB node and the parent IAB node of the upstream IAB node.

2. The method of claim 1, wherein the link state indication information is sent through an IAB link state message or a CG Failure Information message or a radio resource control (RRC) uplink message or an uplink media access control (MAC) control element (CE) or control layer control information.

3. The method of claim 1, wherein sending, by the IAB node, the link state indication information to the donor CU comprises:
   after acquiring, by the IAB node, a message indicating that the link failure occurs to one parent IAB node or one parent IAB node is executing the link migration/adjustment, sending the link state indication information to the donor CU through another parent IAB node.

4. A communication unit, comprising a processor, a memory and a communication bus, wherein
   the communication bus is configured to implement connection and communication between the processor and the memory; and
   the processor is configured to execute at least one computer program stored in the memory to implement at least one step of the integrated access backhaul (IAB) link control method of claim 1.

5. A non-transitory computer readable storage medium, which stores at least one program, wherein at least one processor is capable of executing the at least one program to perform the integrated access backhaul (IAB) link control method of claim 1.

6. The method of claim 1, wherein sending, by the IAB node, the link state indication information to the donor CU comprises:
   after acquiring, by the IAB node, a message indicating that the link failure occurs to one parent IAB node or one parent IAB node is executing the link migration/adjustment, sending the link state indication information to the donor CU through another parent IAB node.

7. The method of claim 2, wherein sending, by the IAB node, the link state indication information to the donor CU comprises:

after acquiring, by the IAB node, a message indicating that the link failure occurs to one parent IAB node or one parent IAB node is executing the link migration/adjustment, sending the link state indication information to the donor CU through another parent IAB node.

8. An integrated access backhaul (IAB) link control method, comprising:

acquiring, by an IAB node, that a link failure occurs to an upstream IAB node of the IAB node or an upstream IAB node of the IAB node is executing a link migration/adjustment;

sending a radio resource control (RRC) reestablishment request to a donor centralized unit (CU); and receiving an RRC reestablishment message, wherein the link failure occurs to the upstream IAB node of the IAB node refers to a link failure between the upstream IAB node of the IAB node and a parent IAB node of the upstream IAB node, wherein the RRC reestablishment request comprises a reestablishment cause, and the reestablishment cause comprises a parent IAB link failure occurring between the upstream IAB node of the LAB node and the parent IAB node of the upstream IAB node.

9. The method of claim 8, wherein the RRC reestablishment message comprises an identifier of a cell used for reestablishment or an identifier of a distributed unit (DU) used for reestablishment.

10. The method of claim 9, after receiving the RRC reestablishment message, comprising:

determining, by the IAB node, a target IAB node to be connected according to the cell identifier or the DU identifier, and the target IAB node comprises an original parent IAB node or a newly selected parent IAB DU during reestablishment.

11. A communication unit, comprising a processor, a memory and a communication bus; wherein the communication bus is configured to implement connection and communication between the processor and the memory; and the processor is configured to execute at least one computer program stored in the memory to implement at least one step of the integrated access backhaul (IAB) link control method of claim 8.

12. A non-transitory computer readable storage medium, which stores at least one program, wherein at least one processor is capable of executing the at least one program to perform the integrated access backhaul (IAB) link control method of claim 8.

\* \* \* \* \*